United States Patent
Murray, III

(10) Patent No.: US 8,482,181 B2
(45) Date of Patent: Jul. 9, 2013

(54) THREE PHASE SYNCHRONOUS RELUCTANCE MOTOR WITH CONSTANT AIR GAP AND RECOVERY OF INDUCTIVE FIELD ENERGY

(75) Inventor: James F. Murray, III, Oklahoma City, OK (US)

(73) Assignee: Convergent Power, Inc., Los Angeles, CA (US)

( * ) Notice: Subject to any disclaimer, the term of this patent is extended or adjusted under 35 U.S.C. 154(b) by 0 days.

(21) Appl. No.: 13/562,199

(22) Filed: Jul. 30, 2012

(65) Prior Publication Data

US 2013/0057099 A1    Mar. 7, 2013

Related U.S. Application Data

(63) Continuation-in-part of application No. 12/993,941, filed as application No. PCT/US2009/046246 on Jun. 4, 2009, now Pat. No. 8,373,328, application No. 13/562,199, which is a continuation-in-part of application No. 13/390,437, filed as application No. PCT/US2010/045298 on Aug. 12, 2010.

(60) Provisional application No. 61/058,824, filed on Jun. 4, 2008, provisional application No. 61/234,011, filed on Aug. 14, 2009.

(51) Int. Cl.
    *H02K 1/22*    (2006.01)
(52) U.S. Cl.
    USPC ...................................... 310/261.1
(58) Field of Classification Search
    USPC ...................... 310/261.1, 112, 114
    See application file for complete search history.

(56) References Cited

U.S. PATENT DOCUMENTS

| | | |
|---|---|---|
| 120,057 A | 10/1871 | Gramme |
| 218,520 A | 8/1879 | Gramme |
| 219,393 A | 9/1879 | Edison |
| 256,182 A | 4/1882 | Wheeler |
| 269,036 A | 12/1882 | Fisher |
| 269,281 A | 12/1882 | Gramme |
| 295,552 A | 3/1884 | Hochhausen |
| 323,976 A | 8/1885 | Thomson |
| 331,815 A | 12/1885 | Orton |
| 339,079 A | 3/1886 | Thomson |
| 357,115 A | 2/1887 | Buckingham |
| 369,754 A | 9/1887 | Thomson |

(Continued)

FOREIGN PATENT DOCUMENTS

| | | |
|---|---|---|
| CA | 1030600 | 5/1978 |
| EP | 0151199 A1 | 8/1985 |

(Continued)

OTHER PUBLICATIONS

International Search Report for PCT/EP2000/001314 dated Jul. 13, 2000.

(Continued)

*Primary Examiner* — Nguyen N Hanh
(74) *Attorney, Agent, or Firm* — Parsons Behle & Latimer

(57) ABSTRACT

A synchronous reluctance motor system is disclosed. The system may generally comprise an input power source that provides alternating phase current and voltage (e.g., AC current). The input power may be further conditioned through a variable voltage conditioner. The system may also include capacitive elements connected in series with the motor windings.

32 Claims, 21 Drawing Sheets

U.S. PATENT DOCUMENTS

| | | | |
|---|---|---|---|
| 373,145 A | 11/1887 | Main | |
| 392,765 A | 11/1888 | Thomson | |
| 397,550 A | 2/1889 | Hunter | |
| 405,602 A | 6/1889 | Rosenqvist | |
| 406,494 A | 7/1889 | Wood | |
| 648,529 A | 5/1900 | Roinson | |
| 849,713 A | 4/1907 | Alexanderson | |
| 1,334,831 A | 3/1920 | Bergman | |
| 1,961,416 A | 6/1934 | De Luca | |
| 2,634,627 A | 4/1953 | Flynn | |
| 2,688,886 A | 9/1954 | Flynn | |
| 3,132,269 A | 5/1964 | Craske | |
| 3,168,665 A | 2/1965 | Holper | |
| 3,202,963 A | 8/1965 | Flynn | |
| 3,354,333 A | 11/1967 | Henry-Baudot | |
| 3,360,667 A | 12/1967 | Gordon | |
| 3,539,854 A | 11/1970 | Futterer | |
| 3,723,779 A | 3/1973 | Gillum | |
| 3,799,462 A | 3/1974 | Fahrbach | |
| 4,005,347 A | 1/1977 | Erdman | |
| 4,103,196 A | 7/1978 | Saito et al. | |
| 4,274,023 A | 6/1981 | Lamprey | |
| 4,459,519 A | 7/1984 | Erdman | |
| 4,595,975 A | 6/1986 | Gray, Sr. | |
| 4,659,953 A | 4/1987 | Luneau | |
| 4,661,747 A | 4/1987 | Gray, Sr. | |
| 4,661,756 A | 4/1987 | Murphy et al. | |
| 4,746,844 A | 5/1988 | MacKelvie et al. | |
| 4,780,632 A | 10/1988 | Murray, III | |
| 4,962,331 A * | 10/1990 | Smith | 310/216.001 |
| 5,175,462 A | 12/1992 | Yoshino et al. | |
| 5,196,775 A | 3/1993 | Harris et al. | |
| 5,274,907 A | 1/1994 | Moorehead | |
| 5,331,729 A | 7/1994 | Moorehead | |
| 5,334,893 A | 8/1994 | Oudet et al. | |
| 5,786,645 A | 7/1998 | Obidniak | |
| 5,861,724 A | 1/1999 | Ackerson | |
| 5,886,450 A | 3/1999 | Kuehnle | |
| 6,066,941 A | 5/2000 | French | |
| 6,133,664 A | 10/2000 | Torok et al. | |
| 6,389,678 B1 | 5/2002 | Ackermann et al. | |
| 6,392,370 B1 | 5/2002 | Bedini | |
| 6,504,272 B2 | 1/2003 | Sakamoto | |
| 6,518,752 B1 * | 2/2003 | Wyss | 324/207.25 |
| 6,545,444 B2 | 4/2003 | Bedini | |
| 6,664,750 B2 | 12/2003 | Pelonis | |
| 6,765,321 B2 | 7/2004 | Sakamoto | |
| 7,036,207 B2 | 5/2006 | Neal | |
| 7,242,118 B2 | 7/2007 | Sakamoto | |
| 7,248,006 B2 | 7/2007 | Bailey et al. | |
| 7,781,931 B2 * | 8/2010 | Ishikawa et al. | 310/112 |
| 7,834,503 B2 | 11/2010 | Bojiuc | |
| 7,902,708 B2 | 3/2011 | Elmaleh | |
| 8,006,789 B2 * | 8/2011 | Dial | 180/65.51 |
| 8,373,328 B2 * | 2/2013 | Murray | 310/261.1 |
| 2002/0113511 A1 | 8/2002 | Daikoku et al. | |
| 2003/0117111 A1 | 6/2003 | Bedini | |
| 2003/0201686 A1 | 10/2003 | Narita et al. | |
| 2004/0080227 A1 | 4/2004 | Tung Kong et al. | |
| 2004/0095164 A1 | 5/2004 | Kernahan | |
| 2004/0119365 A1 | 6/2004 | Breznak et al. | |
| 2005/0140230 A1 | 6/2005 | Johnson et al. | |
| 2005/0189927 A1 | 9/2005 | Myers | |
| 2005/0218728 A1 | 10/2005 | Stewart et al. | |
| 2006/0082237 A1 | 4/2006 | Kerlin | |
| 2006/0087186 A1 | 4/2006 | Wasson et al. | |
| 2006/0125436 A1 | 6/2006 | Lin | |
| 2006/0145561 A1 | 7/2006 | Sakuma et al. | |
| 2006/0273686 A1 | 12/2006 | Edelson et al. | |
| 2008/0083579 A1 | 4/2008 | Okuda | |
| 2009/0108698 A1 | 4/2009 | Guan et al. | |
| 2010/0033029 A1 | 2/2010 | Lucas Torralba et al. | |
| 2010/0084938 A1 | 4/2010 | Palmer | |
| 2010/0123426 A1 | 5/2010 | Nashiki et al. | |
| 2010/0295401 A1 | 11/2010 | Nakagawa et al. | |
| 2011/0074232 A1 | 3/2011 | Murray | |
| 2012/0139368 A1 | 6/2012 | Murray, III | |

FOREIGN PATENT DOCUMENTS

| | | |
|---|---|---|
| JP | 08-009602 A | 1/1996 |
| JP | 08-098479 A | 4/1996 |
| JP | 08-149766 A | 6/1996 |
| JP | 09-285081 A | 10/1997 |
| WO | WO8502728 | 6/1985 |
| WO | WO0054295 | 9/2000 |
| WO | WO2009149251 | 12/2009 |
| WO | WO2011019897 A2 | 2/2011 |

OTHER PUBLICATIONS

US Patent and Trademark Office, Office Action Dated Sep. 10, 2012 for U.S. Appl. No. 12/993,941.

International Search Report & Written Opinion issued in corresponding PCT Application No. PCT/US2010/045298 dated Mar. 3, 2011.

Patent Cooperation Treaty, International Search Report for PCT/US2012/063864 dated Feb. 1, 2013.

Patent Cooperation Treaty, International Search Report for PCT/US2012/065221 dated Feb. 11, 2013.

Niazi, Peyman; Permanent Magnet Assisted Synchronous Reluctance Motor Design and Performance Improvment; Dissertation (online), Dec. 2005 (retrieved on Jan. 8, 2013 from http://repository.tamu.edu/bitstream/handle/1969.1/3178/etd_tamu-2005C-ELEN-Niazi.pdf).

Patent Cooperation Treaty, International Search Report for PCT/US2012/063616 dated Feb. 1, 2013.

Patent Cooperation Treaty, International Search Report for PCT/US2012/065199 dated Feb. 1, 2013.

Patent Cooperation Treaty, International Search Report for PCT/US2012/063615 dated Mar. 14, 2013.

* cited by examiner

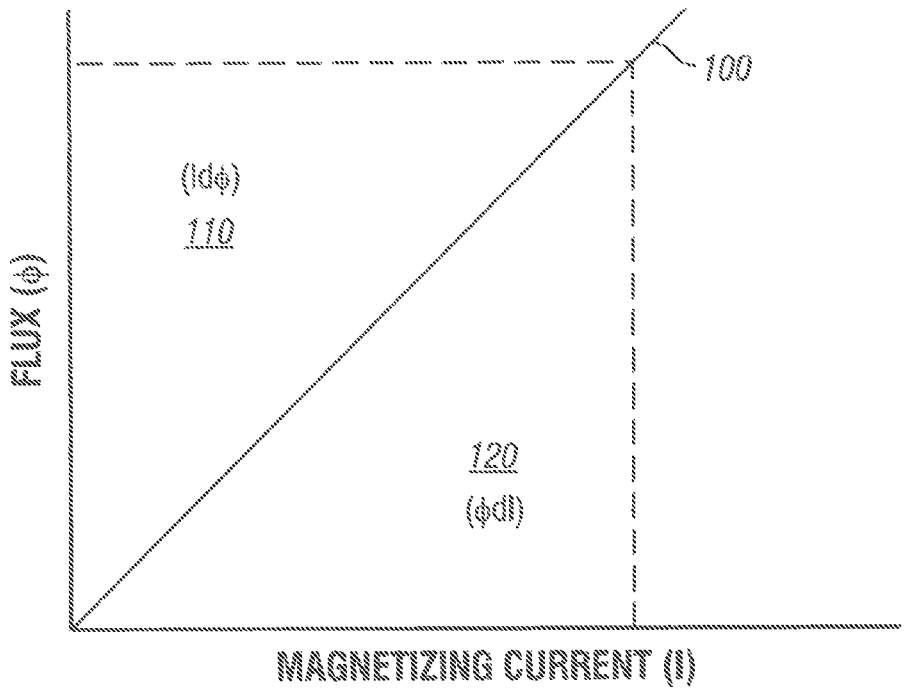
FIG. 1
*(Prior Art)*
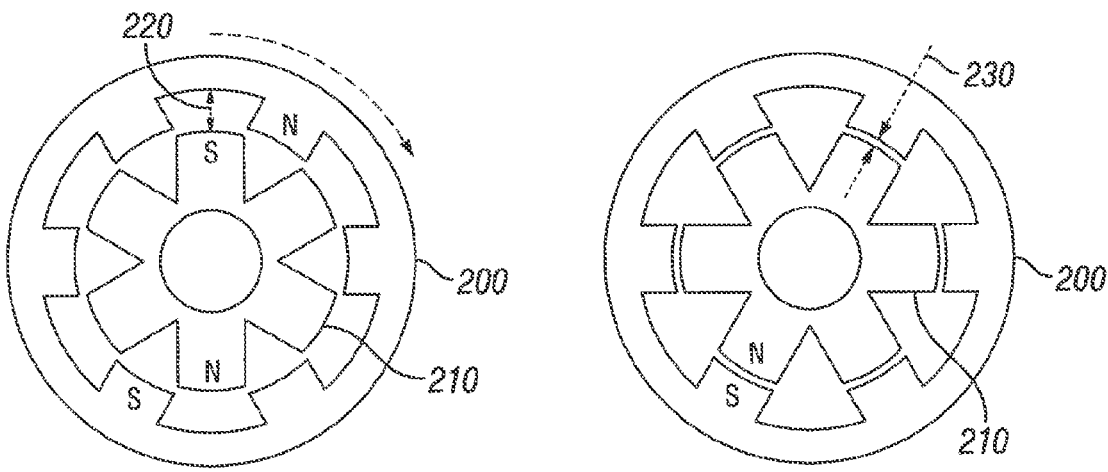
FIG. 2A
*(Prior Art)*
FIG. 2B
*(Prior Art)*

VECTOR DIAGRAM AT RESONANCE

THREE PHASE SYNCHRONOUS RELUCTANCE MOTOR WITH CONSTANT AIR GAP AND RECOVERY OF INDUCTIVE FIELD ENERGY

CROSS REFERENCE TO RELATED APPLICATIONS

This application is a continuation-in-part of application Ser. No. 12/993,941, which has a 35 U.S.C. §371(c) date of Dec. 3, 2010, now U.S. Pat. No. 8,373,328 and which in turn is a 35 U.S.C. §371 filing of Application No. PCT/US09/46246, filed Jun. 4, 2009, which in turn claims the benefit under 35 U.S.C. §119 to provisional Application No. 61/085,824, filed Jun. 4, 2008, and the entire contents of each are hereby incorporated by reference.

This application is also a continuation-in-part of application Ser. No. 13/390,437, which has a 35 U.S.C. §371(c) date of Feb. 14, 2012, and which in turn is a 35 U.S.C. §371 filing of Application No. PCT/US10/45298, filed Aug. 12, 2010, which in turn claims the benefit under 35 U.S.C. §119 to provisional Application No. 61/234,011, filed Aug. 14, 2009.

This application is also related to the following concurrently-filed applications: application Ser. No. 13/562,214, titled "Controller for Back EMF Reducing Motor;" application Ser. No. 13/562,233, titled "Multi-Pole Switched Reluctance D.C. Motor with Constant Air Gap and Recovery of Inductive Field Energy;" and Provisional Application Ser. No. 61/677,412, titled "Multi-Pole Electrodynamic Machine With A Constant Air Gap And An Elliptical Swash-Plate Rotor To Reduce Back Torque;" each of which are hereby incorporated by reference.

FIELD OF THE INVENTION

The disclosed inventions relate to the field of direct energy conversion and the production of mechanical torque from the utilization of an electric current, and to the field of electric motors and to utilization of direct current as a "motive force." The disclosed inventions also relate to the field of power conversion devices which transform electrical power into rotary mechanical power.

Some disclosed embodiments relate to a class of motor having multiple stator and rotor sections, such that each rotor section is associated with a specific stator section, although attached to a single output shaft. The lateral axis of each rotor section may be disposed at an oblique angle with respect to the axis of the common shaft, and angularly displaced in accordance with the number of rotor sections employed, for example: 90 mechanical degrees for two rotors, 120 degrees for three rotors, etc.

Some disclosed embodiments also relate to multiple motors having two or more motor sections, operating in parallel, each of which is comprised of a stator having two or more salient poles, and a rotor geometry devoid of coils or windings of any kind, affixed obliquely to a motor output shaft, and so disposed as to ensure a constant air gap between the rotor body and the salient poles of an associated stator section.

Some embodiments of the invention also relate to multiple motor sections with their associated armatures, mechanically positioned out of phase with one another, but mounted so as to allow the output pinions of each individual motor to impinge upon a common output gear of larger diameter, mounted upon a separate but common output shaft, such that each individual motor's output is combined mechanically, and afforded an amplification of torque.

Some embodiments of the invention also relate to a single motor having a stator section with salient poles, and a rotor geometry devoid of windings, affixed obliquely to a motor output shaft, and disposed as to ensure a constant air gap between the rotor body and the salient poles of the stator section.

Some embodiments of the invention relate to a poly-phase, synchronous reluctance motor having a stator section with salient poles, and a rotor geometry devoid of windings, affixed obliquely to a motor output shaft, and disposed as to ensure a constant air gap between the rotor body and the salient poles of the stator section.

BACKGROUND

Notwithstanding the increased interest in energy conversion over recent decades, no substantial advances have been made in increasing the conversion efficiency of electric motors. Rather, the art has made incremental advances relating to improved magnetic materials, more powerful permanent magnets, and sophisticated electronic switching devices. Such improvements, at best, relate to very small increases in overall efficiency, usually gained at very considerable expense.

Patents in this area include: U.S. Pat. Nos. 2,917,699; 3,132,269; 3,321,652; 3,956,649; 3,571,639; 3,398,386; 3,760,205; 4,639,626 and 4,659,953. Also in this area are EPO patent no. 0174290 (March 1986); German patent no. 1538242 (October 1969); French patent no. 2386181 (October 1978) and UK patent no. 1263176 (211972).

The basic concept employed in earlier motor art is the interaction between a current carrying conductor(s) and a magnetic field of some kind. This fact is true regardless of motor type. This basic concept appears in DC motors, single phase AC motors, poly phase induction slip motors, which utilize a rotating magnetic field, and in poly phase synchronous motors with externally excited electromagnetic cores, or permanent magnet cores as the case may be.

Other types of designs may be found, for example, in the design of stepper motors, which utilize a magnetic "ratcheting" action upon magnetic material in the armature, in response to applied pulses of current, and various types of reluctance motors in which the rotor moves with respect to a salient pole piece experiencing a large variation in air gap during its motion. But, these devices typically do not have a constant and continuous air gap of fixed dimension between the rotor and the stator.

The prior art has not produced a multiple phase, multiply segmented stator with individual, obliquely disposed, laminated armatures devoted to each stator section, such that each stator/rotor combination employs a continuous air gap of constant dimension, regardless of the elliptical profile of said armatures, but not employing any current carrying conductors, coils, windings or bars within or upon the armatures, as a means of producing torque upon the output shaft.

Nor can it be said that the prior art has arranged such motors to cooperate in "parallel fashion," through a reduction gear arrangement so as to provide an amplification of torque while sharing the mechanical load.

A previous example exists which describes an alternator having a single rotor canted at an angle, and makes use of the unique rotor design featured within this disclosure. Said rotor was introduced in the power conversion device entitled "Alternator Having Improved Efficiency," which was invented by James F. Murray III, filed as application Ser. No.

07/112,025, on Oct. 21, 1987, and later granted U.S. Pat. No. 4,780,632 on Oct. 25, 1988, and is herein incorporated by reference.

There are marked differences between the presently disclosed inventions and the inventions disclosed in the "Alternator Having Improved Efficiency," patent ("the Alternator Patent"). A few non-limiting examples of which are listed as follows:

1.) Alternator of the Alternator Patent can be operated as a motor only when used in conjunction with the basic motor concepts described herein (i.e., requires field flux and current-carrying conductors).

2.) Alternator of the Alternator Patent does not require salient pole projections in order to operate.

3.) Alternator of the Alternator Patent makes use of an electromagnetic field winding, or a permanent magnet as its source of magnetic flux.

4.) Alternator of the Alternator Patent does not require a shaft position indicator, or a commutator, of any kind in order to function.

5.) Alternator of the Alternator Patent does not require a position sensitive, electronically controlled, pulsed power supply, in order to generate electricity.

Other similarities between the Alternator Patent and the presently disclosed inventions include elements possessed by most rotating power converters, such as bearings, shafts, end bells, laminations, mechanical housing, etc.

As evident from the above discussion, electric motors have been in use for well over 100 years, and they exist in several forms. While, the basic concept has not substantially changed, the manner in which the switching of supply current is controlled has evolved. However, existing motors typically experience performance limitations due to the manner in which Back EMF and inductive field energy are treated. The generation of Back EMF in motors of all kinds is chiefly due to two things: the movement of conductors through a magnetic field, called Speed Voltage, and the rate of change of current through a winding, called Transformer Voltage. Conventional wisdom suggests that Speed Voltage Back EMF is totally unavoidable, and in fact, is necessary for the transformation of electrical power into mechanical power in a typical motor. However, one drawback of Speed Related Back EMF is its parasitic nature that serves to degrade the potential supplied to the motor from an outside source (i.e., the source voltage).

The parasitic nature of Back EMF arises from, among other things, the mistaken assumption that Back EMF is required to produce torque. This, in turn, leads to design compromises which must be made in order to implement traditional electrodynamic machine geometries. Consider, for example, a conventional DC Motor consisting of a stator with salient field poles, and a rotor-armature with a self-contained commutator. Application of a DC current to the rotor leads produces a rotary motion of the rotor (i.e., motor action). However, the rotation of the rotor conductors in a magnetic field also induces a voltage in the conductor that opposes the current applied to the rotor leads (i.e., generator action). These facts actually demonstrate an important aspect of conventional machines; if standard design parameters are always followed, then any motor must perform as a generator while it is running, and any generator must perform as a motor while it is in operation. The explanation of this similarity is because both machines are dependent upon the same basic geometry for their functionality, and so, both motor and generator action occur simultaneously in both devices.

The above-described basic geometry of a conventional Speed Voltage based system results in the production of parasitic Back EMF as follows. In a Speed Voltage based system, the magnetic flux must interact with an electrical current-carrying conductor (e.g., rotor windings), thereby producing a mechanical force that generates a torque to turn the motor shaft (i.e., a motor action). The subsequent motion of the conductors through the magnetic flux produces a relatively high Back EMF (i.e., acts in opposition to the torque producing current) due to the motion of the conductors with respect to the magnetic flux (i.e., a generator action). In order to continue normal operation, and establish electrical equilibrium, any motor that produces a Back EMF having a constant average value, must draw down on the line-potential in order to overcome the effects of this parasitic Back EMF voltage. Thus, this process of source potential degradation due to Back EMF requires the input of considerable potential energy from the source in the form of a voltage in order to maintain normal operation.

Another design factor of conventional Speed Voltage dependent machines is that, typically, as the rotor turns from pole to pole the air gap between the rotor and the stator will vary in width (from a smaller gap when the rotor is "facing" a stator pole, to a larger gap when the rotor is "between" stator poles). This change in the air gap results in a change in the magnetic potential energy within the air gap resulting in the Back EMF component described above. These and other significant issues and inefficiencies persist in traditional DC motor designs.

Generally, three phase synchronous motors, (e.g., AC powered machines) are known in the art. Typically, this kind of motor relies upon a rotating magnetic field as its source of propulsion, but, unlike a standard three phase induction motor, a three phase synchronous motor typically employs a magnetic field core which is excited by an external source of DC current. The interaction of the DC field with the rotating AC field provides the mechanism for synchronizing the rotation of the rotor of the three phase synchronous motor with the rotation of the magnetic field created with current from a power plant generator, potentially located many miles away from the motor. Synchronization occurs when the DC field of the motor's rotor "locks into phase" with the rotating field produced by the AC-powered windings in the motor's stator.

Once this condition of phase lock is achieved, synchronous motors are generally capable of providing large output shaft torques at relatively high levels of operational efficiency, and they can also provide adjustable power factor control, which is desirable in certain industrial applications.

Some potentially undesirable aspects of existing synchronous reluctance motors are that they are typically not self-starting, and, consequently, they may require a starter motor, or some other initiating device. Existing synchronous motors also typically require an external source of DC power to excite the motor's internal rotor field. Other drawbacks also exist with current synchronous reluctance motor designs.

Currently, there are various types of reluctance motors including: synchronous reluctance motors, variable reluctance motors, and switched reluctance motors. Regardless of type, reluctance motors typically are most desirable in applications where a high power density at relatively low cost is desirable.

Existing reluctance motors are typically designed with multiple, salient electromagnetic poles situated upon a stator, and a rotor consisting of a soft magnetic material, such as laminated silicon steel which also has multiple pole projections emanating like spokes from the center of the rotor core. Typically, the number of rotor poles is typically less than the number of stator poles to ensure a maximum change in the magnetic reluctance as the rotor advances from one stator magnetic pole to another, thereby producing a large torque. This unequal rotor and stator pole arrangement also prevents multiple poles from aligning simultaneously which, if not prevented, could stall the motor.

Typically, existing reluctance motors carry no electric current conductors upon or within their rotors. Accordingly, when operated at synchronous speed, these motors produce no current-related losses within the rotor, in contrast with the losses found in typical induction slip motors. However, standard reluctance motors will produce a certain amount of torque-flutter, especially at lower rotational speeds, and the flux switching from pole to pole produces large changes in air-gap dimensions, which does produce a high degree of Back EMF. Other drawbacks also exist in current reluctance motor designs.

For example, existing designs for three phase synchronous reluctance motors employ stators that are typically configured to accept either wave windings or lap windings, thus producing a so-called current sheet which spins at synchronous speed, and produces a resultant magnetic field vector which does the same. This rotating magnetic field interacts with the DC-based field of the motor's rotor, and keeps it turning at 3600 RPM. However, there are some drawbacks to this arrangement. One drawback is that the distribution of copper windings in wave fashion around the inner periphery of the stator encourages a great deal of magnetic "coupling" between the various windings, such that the resulting current impedance becomes a "distributed characteristic" known as the synchronous impedance, the effects of which are unchangeable in the standard reluctance motor design. Another drawback of typical designs is that they also produce a Back EMF with a considerable degree of DC content, which is difficult to dissipate. Other drawbacks also exist.

Before turning to the improvements and advantages of the disclosed inventions, a brief review of some fundamental concepts for electric motor operation is instructive. The basic premise is that the force developed by a current carrying conductor immersed in a magnetic field is described as (equation 1):

$$F=BlI,$$

where, F is the force developed, B is the flux density, l is the conductor length, and I is the current. This simple equation suggests that a current-carrying conductor situated in a magnetic field will experience a force that is directly proportional to the applied current, the flux density and the length of the conductor. This principle underlies the operation of the millions of electric motors spinning every day in locations all over the world.

The voltage produced by a conductor moving through a magnetic field can be described using (equation 2):

$$V=Blv,$$

where, V is the voltage developed, B is the flux density, l is the conductor length, and v is the tangential velocity of the conductor as it rotates. Accordingly, if a conductor is moved through a magnetic field by an external motive force (e.g., a prime mover), then the voltage produced may give rise to a current in the conductor, and such a device exhibits generator action. Conversely, if a conductor is carrying a current, and thereby moves through a magnetic field under the influence of the current itself, the device exhibits motor action. However, in the act of moving through the field a voltage is produced within the conductor in accordance with equation 2, and acts in such a manner as to diminish the applied current responsible for the conductor's motion, and this produced voltage is typically referred to as a Back EMF.

Examining the actual power present in the system can be accomplished as follows. Mechanical power can be expressed as the product of Force and Velocity. Velocity is therefore missing from the first relationship (equation 1), but it can be included by multiplying both sides of equation 1 by the additional parameter:

$$Fv=BlIv.$$

The resulting expression now denotes a form of mechanical power expressed as (equation 3), $$Pm=BlIv,$$

where, Pm denotes mechanical power.

In similar fashion, the voltage expression (equation 2) denotes only potential, not power. Electrical power can be expressed as the product of voltage and current. Current is missing from the second relationship (equation 2), but it can also be included by multiplication to both sides of the equation:

$$VI=BlvI.$$

The resulting expression now denotes a form of electrical power as (equation 4), $$Pe=BlvI.$$

Note that BlIv (equation 3) is equal to BlvI (equation 4), and therefore, Pe must be equal to Pm. This analysis is as expected, and holds with current theories that stipulate the applied power is equal to the output power minus the system losses.

Another important factor to consider is the magnetic flux in a DC motor. The flux, $\Phi$, can be expressed as (equation 5):

$$\Phi=LI,$$

where L is the inductance and I is the current. Taking the derivative of the flux expression with respect to time, t, yields:

$$d\Phi/dt=d(LI)/dt.$$

Substituting V for $d\Phi/dt$ gives (equation 6):

$$V=LdI/dt+IdL/dt.$$

The first term in equation 6 is the product of inductance (L) and the rate of change of current (I) with respect to time (t). This is the previously discussed Transformer Voltage Vt. The second term is the product of the current (I) and the rate of change of Inductance (L) with respect to time (t). This is the previously discussed Speed Voltage Vs. Thus the relationships for each Voltage type is:

Transformer Voltage (equation 7), Vt=L dI/dt, and
Speed Voltage (equation 8), Vs=I dL/dt.

Expressing Vt and Vs in terms of the energy can be accomplished as follows. The field energy, Pt, due to the Transformer Voltage may be expressed as follows:

$$Pt=IVt.$$

Substituting for Pt and Vt gives:
dE/dt=I $d\Phi$/dt. Simplifying to (equation 9):

$$dE=Id\Phi.$$

Equation 9 expresses the quantity commonly referred to as the reactive energy. The dissipative energy for the system can, likewise, be expressed as follows. Starting from equation 8, Vs=I dL/dt, and realizing that L=$\Phi$/I, then L=$\Phi(I^{-1})$, and dL/dt=$\Phi I^{-2}$dI/dt.

Substituting ($\Phi I^{-2}$)dI/dt for dL/dt gives:
Vs=I $(-\Phi/I^2)$ dI/dt. Multiplying both sides of the equation by I yields an expression for dissipative power, Ps. But, VsI=dE/dt, therefore, Ps=dE/dt=$-\Phi$ dI/dt, and (equation 10):

$$dE=\Phi dI.$$

Combining equation 9 and equation 10 the total energy in an air-gap is (equation 11):

$$E_T = Id\Phi + \Phi dI.$$

The energy relationship described in equation 11 can be further explained with reference to FIG. 1, which depicts a plot of flux (Φ) versus current (I) of the air gap energy components. As shown, the line 100 represents the total magnetic energy given by (equation 12):

$$Em = I\Phi.$$

The region 110 above line 100 indicates the (I dΦ) reactive energy region and region 120 below line 100 indicates the (Φ dI) dissipative energy region.

The relevance of this energy relationship can be further explained with reference to FIGS. 2A and 2B which show a cross-sectional representation of a prior art reluctance motor. As shown in FIG. 2A, rotor 210 is in a position between two stator 200 poles yielding the motors largest air gap 220 designated as (g1). In normal operation, when the magnetic poles are energized with the proper magnetic polarity, the flux lines thus created will reach across this gap 220 as they are formed, and cause the rotor 210 to rotate to the position depicted in FIG. 2B, thereby reducing the reluctance in the magnetic circuit and reducing the air gap 230 to its smallest dimension designated as (g2). A torque impulse is also created during this motoring action, and the average mechanical work which is delivered on the rotor 210 will be found to be directly equal to the change in energy (Φ dI) within the air gap.

Referring now to FIG. 3, which is a double graph representing the energy relationship for the prior art motor illustrated in FIGS. 2A and 2B. The plot labeled 300 corresponding to air gap (g1) represents the relationship between the excitation flux and the excitation current at the point in time where the gap dimension is largest (e.g., air gap 220 as depicted in FIG. 2A). Note the larger value of the excitation current ($I_1$), and the relatively lower value of the associated flux ($\Phi_1$). This is due to the fact that the large air gap has a high value of magnetic reluctance, and therefore requires substantially more current to produce the associated value of flux ($\Phi_1$). This condition changes for the plot labeled 310 (corresponding to air gap g2), because the air gap has been greatly reduced, and much less current ($I_2$) is required to establish and hold the flux ($\Phi_2$) within the magnetic circuit. Note that the current has reduced to value $I_2$, and the flux has actually increased to value $\Phi_2$. This may sound like a positive result, but actually, it is not, because this large change in the flux (Φ) is also responsible for the production of an associated Back EMF.

For illustrative purposes, the following four calculations using equation 11 can be made representing the component energies associated with each air gap size (g1 and g2).

For a gap size g1: $\Phi_1 dI = (13.5)(18-12) = 81$ Joules, and $I_1 d\Phi = (18)(15-13.5) = 27$ Joules. For a gap size g2: $\Phi_2 dI = (15)(18-12) = 90$ Joules, and $I_2 d\Phi = (12)(15-13.5) = 18$ Joules.

Thus, each energy component has a different value, but much more interesting to note is that the total energies E1 and E2 which represent the energy for air gap sizes of g1 and g2, respectively, are equal (27+81)=(18+90)=108 Joules. This is consistent with the understanding that the motor shaft energy and motor input energy are equal in a motor of standard design, and co-exist within the motor structure. Hence, the term co-energy.

In further illustration of conventional DC motor operation, consider the following example of normal, Speed Voltage dependent operation. One skilled in the art will recognize that a number of the principles of DC motor operation illustrated in the following paragraphs are also applicable to AC motors. As depicted schematically in FIG. 4A, an exemplary standard DC motor with a power rating of 3.528 Horse Power has the following characteristics:

Full Load Speed=1800 RPM.
Continuous Shaft Torque=123.529 in-Lbs.
Terminal Voltage=124 Volts DC.
Full Load Current=26.326 amps.
Copper Losses=315.912 watts.
Other Losses=315.912 watts in the aggregate.
Back EMF Power Loss=2632.600 watts.
Shaft Power=3.528 H.P.
Total Input Power=3264.424 watts.
System Efficiency=80.645%.

Accordingly, if the proper voltage is applied to the motor terminals, and the mechanical load does not vary, the above properties should prevail indefinitely after thermal equilibrium has been reached. However, this same example DC motor will have drastically different properties upon first being started. This is illustrated by the diagram in the second diagram in FIG. 4B, showing the start-up, or in-rush operation.

At the instant illustrated, the DC motor has not yet begun to rotate, and there is no Back EMF, but the starting torque is relatively large at 637.986 in-lbs, which is 5.165 times the running torque. The Back EMF that develops as a function of the motor's increasing rotational speed reduces the start-up current of 135.965 amps down to the full load ampere (FLA) value of 26.326 amps. This "high start-up current," behavior is standard and expected in conventional Speed Voltage dependent motors.

Bearing these facts in mind, it stands to reason that for two, otherwise-identical, electric motors, the one that employs a larger, or surplus, number of winding turns per pole would experience a comparatively higher inductance L, and correspondingly, a relatively higher total Back EMF, resulting from the sum of Vs and Vt. Accordingly, to avoid this occurrence, it is typical in the prior art of electric motor design that the winding turns per pole are generally kept to a minimum, for a given operational voltage, thus allowing the Speed Voltage component to drive the design criteria, and minimize the Transformer Voltage component.

However, this engineering trade-off, of keeping inductance L low by using fewer windings, diminishes the amount of stored energy in the motor's magnetic circuit, and causes motor performance to be tied to the characteristics imposed by the Speed Voltage component of the Back EMF, most notably, the requirement for a higher magnitude source voltage and reduced torque output. Other motor design drawbacks and Back EMF issues also exist in prior systems.

SUMMARY

An electric motor is disclosed, some embodiments having a motor segment having a stator, having stator poles and stator windings and a rotor having a flux path element. For some embodiments, the flux path element is attached to a rotor shaft at an oblique angle to the longitudinal axis of the shaft. The flux path element has a shape that provides a uniform constant air gap between it and the stator poles when the shaft is rotated.

An electric motor is disclosed, some embodiments having a plurality of motor segments, each segment having a stator, having stator poles and stator windings and a rotor having a flux path element. For some embodiments, the flux path elements are attached to a rotor shaft at an oblique angle to the longitudinal axis of the shaft. The flux path elements have a shape that provides a uniform air gap between them and the stator poles when the shaft is rotated. The rotor shafts of said motor segments are mechanically coupled to each other.

In an embodiment, the flux path elements comprise a silicon steel lamination stack or a solid ferrite plate. In a further embodiment, the motor has a shaft angle sensor and a motor controller, and the motor controller receives a shaft angle from the sensor and supplies current pulses to the stator windings according to the shaft's angular position signal.

In a further embodiment, the stator poles are positioned in pole pairs with the rotor and rotor shaft between them and form isolated stator magnetic field circuits when the stator windings are supplied with electrical current, such that a magnetic field is established having a single magnetic polarity in each of the poles of said pole pairs, with each pole of the pole pairs having opposite magnetic polarity. In further embodiments more than two poles are installed in each stator section.

In a further embodiment, the rotor flux path elements have a shape defined by the volume contained between two parallel cuts taken through a right circular cylinder at an angle other than 90 degrees with respect to the axis of symmetry of said cylinder, each flux path element having front and back faces that are substantially elliptical, and having major and minor axes. In an embodiment, the flux element angle with respect to the axis of symmetry is substantially 45 degrees. In an embodiment, multiple rotors are attached to a common shaft, or to independent shafts coupled through a clutch or similar selectablely engageable coupler, and the rotor flux path elements are arranged on said common shaft such that the major axes of the flux path elements are equally spaced on the shaft and wherein the stator poles are in the same position with respect to the common shaft for each motor segment. In another embodiment of this arrangement, the motor has two motor segments and two rotor flux path elements and the rotor flux path elements are arranged on the common shaft such that their major axes are spaced 90 degrees apart.

In a further embodiment, the motor has rotor counterweights to statically and dynamically balance the mass of the rotor flux elements.

In a further embodiment, the motor has starter windings adapted to start the motor in a desired rotational direction.

In a further embodiment, current generated in the windings from collapsing magnetic fields is captured and used.

One advantage of the presently disclosed system and method is that it addresses the drawbacks of existing systems.

Another advantage of the presently disclosed system is to provide a motor which develops a significantly reduced Speed Voltage (Vs) component of the Back EMF.

Another advantage of the presently disclosed system is to provide an alternating current motor which makes use of a plurality of salient poles within its stator structure that may possess characteristics different than typically employed by existing Speed Voltage dependent systems. For example, the stator poles should be arranged or constructed to be protected from flux movement in two directions in order to minimize eddy currents, and related iron losses. For example, fabricating all or part of the pole pieces from different metals, using grain orientation, using ferrite materials, using distributed air gap material, or laminations disposed at right angles with respect to one another, are some techniques that may be implemented to inhibit the production of eddy currents, and thereby lessen iron losses.

Another advantage of the presently disclosed system is to provide an alternating current motor which employs a uniquely shaped rotor having a constant air gap with respect to the salient pole pieces. The constant air gap contributes to a smaller rate of change of inductance in the magnetic circuit, thereby reducing the speed voltage component Vs.

Another advantage of the presently disclosed system is to provide an alternating current motor which employs a shaped rotor having no coils, windings, conductors or bars within its structure. This also contributes to a lower speed voltage component Vs of the Back EMF.

Another advantage of the presently disclosed system is to provide a motor whose operation is governed by controller, such as an electronic controller, so designed as to orchestrate, synchronize, and control all the internal functions of the direct current motor.

Another advantage of the presently disclosed system is to provide a motor with a surplus of salient pole windings which are configured to store re-usable magnetic energy within the stator power coil windings. The surplus windings arise from the additional windings possible with the presently-disclosed designs compared to the amount of windings on a similar capacity, traditionally designed electric motor.

These and other advantages are achieved in the presently disclosed system by providing a unique arrangement of stator and rotor geometries in conjunction with an electronic controller such that rotation is achieved by means of reluctance switching, synchronized by a position sensor, and acting in response to an electronic controller such that motor input power is properly managed and directed so as to produce a continuous rotation, while simultaneously recovering unused energy momentarily stored within the stator windings.

One embodiment of the presently disclosed system employs a rotor fabricated from a stack of steel disks, chemically insulated from one another to discourage and reduce eddy currents. The disks may be pressed upon an arbor which, in turn, is obliquely disposed with respect to the intended axis of rotation, and suitably machined so as to produce an assembly with a peripheral contour generally equivalent to that of a cylinder. The stator may be composed of a plurality of salient pole sets, each set comprising a pair of poles, and associated windings, arranged 180 degrees apart from one another upon the stator, and each pole set angularly displaced from one another by a desired number of mechanical degrees.

In some embodiments, each pole set may also be provided with a concave pole face, whose radius is slightly greater than the radius of the rotor. The rotor, therefore, defines an air gap of continuous dimension when rotated. The rotor is in magnetic series with each set of magnetic poles, thereby completing the magnetic circuit, and the rotor reacts to each set of energized poles by undergoing a mechanical displacement equal in degrees to the pole set's mechanical distribution around the periphery of the stator assembly. As the rotor rotates, the zone in which the flux is coupled to the active pole pieces may vary in position along the length of each pole face. However, the width of the air gap separating the pole face from said rotor will not vary.

This arrangement permits the magnetic potential within the air gap to remain substantially constant, thereby minimizing the change in induction which would normally give rise to the development of a large Speed Voltage (Vs). A greatly reduced Speed Voltage allows a reduced Back EMF in this embodiment of the disclosed direct current motor.

Other aspects and advantages of the presently disclosed systems and methods will now be discussed with reference to the drawings.

BRIEF DESCRIPTION OF THE DRAWINGS

FIG. 1 is a plot of flux versus current of air gap energy components in a typical prior art device.

FIGS. 2A and 2B are cross sectional views illustrating a change in air gap for a prior art device.

DETAILED DESCRIPTION

Figure 3:
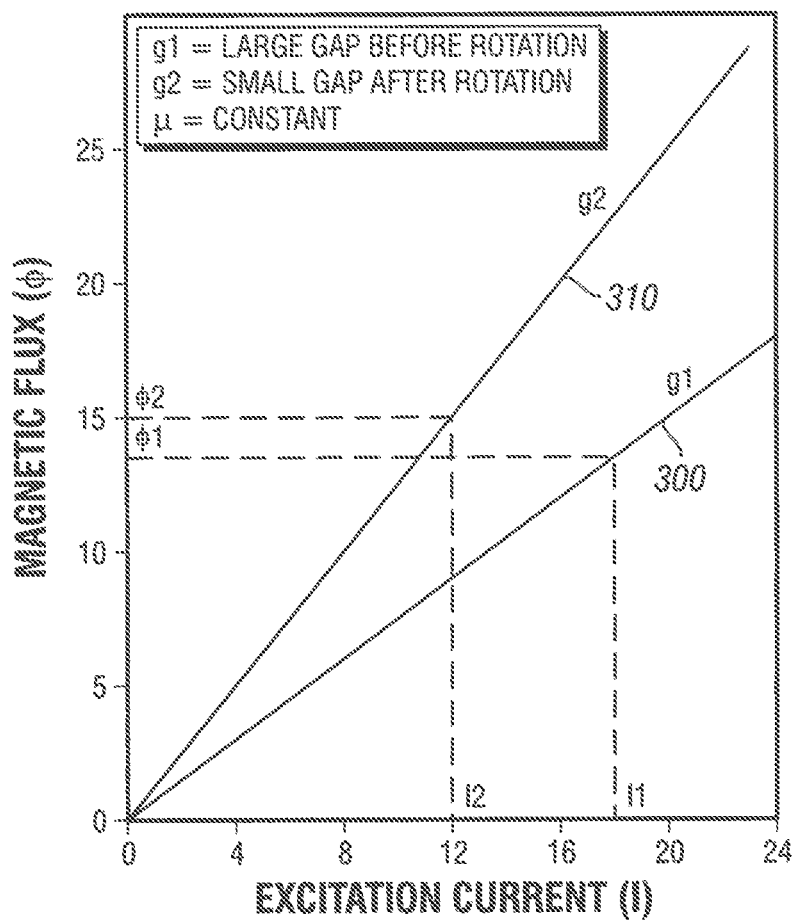
FIG. 3 is a plot of flux versus current for the linear energy relationship in the air gap for the prior art device shown in FIGS. 2A and 2B.

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

FIGS. 5-8 illustrate one embodiment of the motor disclosed herein. Reviewing FIG. 5, it will be seen that the motor consists of a double stator housing (1, 2) physically separated, but functionally joined together by means of a continuous shaft (10), upon which are mounted two armatures (3, 4), one within each stator assembly. The shaft is carried by bearing sets (11), located within end-bells (14, 15).

Rotor assemblies (3, 4) each consist of a stack of silicon steel laminations (9), a molded ferrite core, or any other high permeability magnetic material designed to suppress eddy currents, and machined so as to produce a section of a right circular cylinder canted at an angle of 45 degrees with respect to the motor shaft (10). When viewed face on, the rotor structure appears to be elliptical in shape. However, the side view depicts a rhomboid tilted at 45 degrees. This angle may not be the most optimal angle, and it should be realized that other angles may be employed without departure from the spirit of the invention.

The common shaft (10) may also carry counter weights (7, 8), as depicted, which function to ensure a smooth rotary motion by suppressing mechanical vibrations produced by the uneven mass distribution of the elliptical armature sections (3,4). In another embodiment, each motor segment may include a clutch (25), or some other selectablely engageable coupler in order to couple independent shafts into a common shaft (10). Of course, as many motor segments from one on upwards can be coupled in this, or a similar, manner.

Each stator assembly contains an individual stack of stator laminations (16, 17) or a magnetic ferrite cylinder, from which extend two or more salient pole projections (12, 13), each of which is wound with a power coil (18). The face of each pole projection (5, 6) is extended to the right and the left of center to ensure continuous air gaps of constant dimension (19, 20), which are aligned parallel to the rotor's edge contour regardless of its angular disposition. Those familiar with the art will realize that it may be possible to install more than two pole projections per armature without departing from the spirit of this invention. Under these conditions, the motor will, of course, operate with a single rotor.

The pole projections in each stator section are parallel to each other, but the rotor sections are displaced upon the shaft by a predetermined mechanical angle: 90 degrees for two pole sets 120 degrees for three pole sets, etc.

The motor shaft extends several inches beyond the end bell housings (14, 15) on each side of the motor. One end of the shaft is utilized as a take off point for mechanical power, or load, while the other side of shaft carries a shaft position indicator (21), which is an angular transducer, and may consist of a simple rotary encoder, or a more complex device containing discrete optical sensors and slotted disks.

The stator power windings may be connected in series or in parallel as preferred. The windings receive their drive pulses from switching transistors, MOSFETs, or other solid state switching devices within the controller (22), which in turn receive their firing instructions directly, or indirectly, from the shaft position sensor (21).

Power resistor (23) is used as a sump to harmlessly dissipate any remaining energy associated with the collapsing magnetic fields within the stator as the motor rotates.

A Description of the Rotor Geometry

Figure 6:
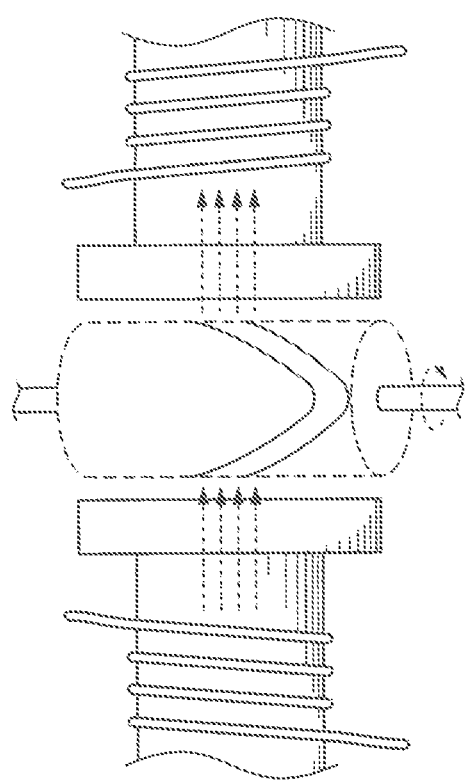
FIG. 6 is a schematic diagram of an individual rotor/stator section, depicting the relationships between such components as rotor geometry, magnetic flux, air gaps, salient poles and power windings in accordance with some embodiments.

Drawing attention now, to FIG. 6, it will be noted, that a cylindrical outline is depicted between the poles of an electromagnet, through which the lines of flux are directed in a upward fashion. Notice also, the solid, elliptical lines shown. These demonstrate the shape of the lamination stack or ferrite core which comprises part of this invention. The shape is described by the result of making two parallel slices through a right circular cylinder at an angle of 45 degrees, and then removing all of the cylindrical body except the elliptical core, as demonstrated.

Figure 7A:
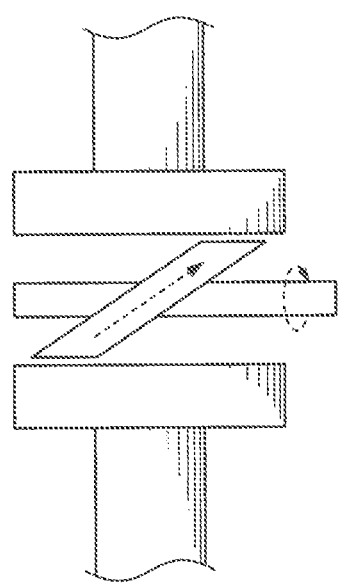
FIG. 7 is a schematic diagram showing maximum and minimum rotor cross-sections relative to air gaps, stator poles and magnetic circuits in accordance with some embodiments.
Figure 7B:
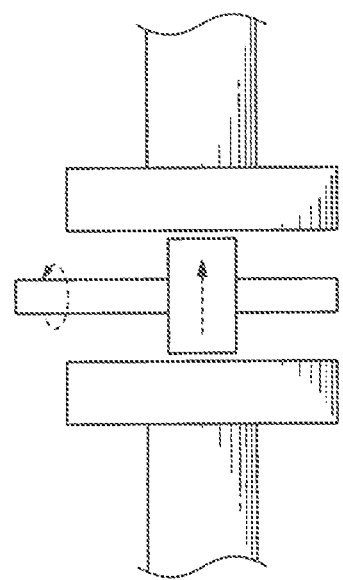

Magnetically, this elliptical rotor has some very interesting properties. FIG. 7 illustrates a schematic cross-sectional view of the flux path of the rotor in two mechanical positions, each 90 degrees apart. Note, in FIG. 7A, that the elliptical cross-section presents a longer path to the magnetic flux than does the cross-section illustrated in FIG. 7B. Note as well that these figures represent approximate flux paths and not actual cross sectional views of the rotor.

Accordingly, the elastic nature of the lines of flux will tend to exert a torque upon the rotor geometry, forcing the assembly to rotate 90 degrees, whereby the shortest path is available for the magnetic lines to complete their circuit as is evident in FIG. 7B.

This process does not require the presence of a "secondary" magnetic coil, the addition of which would tend to decrease a motor's overall inductance, by means of quadrature coupling, or armature reaction, during normal operation.

Detailed Description of the Motor's Operation

One DC embodiment of this invention employs two rotors, each fabricated from a stack of laminated disks, pressed upon arbors which are obliquely disposed with respect to the intended axis of rotation, and then integrally machined in order to provide both rotors with peripheral contours equivalent to that of a cylinder while retaining their overall elliptical shape. Each stator section is formed by a lamination stack having two, spaced-apart, salient pole projections terminating in concave pole faces whose radii are slightly larger than the radius of each rotor. Both rotors thereby define air gaps of constant dimension while rotating. Each rotor is in magnetic series with two air gaps and two pole pieces and a complete magnetic circuit which contains its own coils for the production of magnetic flux. Each magnetic rotor circuit is separate and distinct from each other magnetic rotor circuit, although they share a common output shaft. An angular position sensor or shaft encoder is positioned at one end of the output shaft, and sends electronic position signals to a DC power supply/controller, which in turn sends pulses to the motor stator sections as required.

The application of a current pulse to a given set of stator coils, causes the rapid rise of magnetic flux within the selected stator section and its associated rotor. The increased flux density then causes the rotation of the active rotor, as the flux lines "shrink" to ensure their manifestation in a circuit of minimum length. The output torque is produced by the laws of magnetic reluctance acting in conjunction with the innovative geometry of the rotor. No current carrying conductors are involved in the rotor.

As the first rotor reaches its position of minimum cross-sectional diameter, the shaft encoder then directs the electronic controller to send a power pulse to the second rotor, and the operation repeats itself. When this procedure is enacted every 90 degrees, the result is a smooth angular rotation, and the production of a continuous average torque. However, a secondary result of this arrangement is the production of an electrical output from each stator section as a result of the collapsing of its magnetic field at the end of each power cycle. This electrical energy may be harmlessly dissipated in a sump resistor, or it may be put to use, for example in powering other devices, including lamps or heaters or recovered to supply a portion of the energy used to drive the motor.

In an embodiment, an exemplary motor utilizes a rotor geometry consisting of a lamination stack or a molded ferrite shape, canted at a specific angle with respect to the output shaft, while retaining a circular cross section to the axis of rotation, and presenting an overall elliptical appearance in its own plane. This arrangement allows for a constant air gap to be maintained between the rotor's edge and the pole pieces thereby producing mechanical torque without the utilization of coils or conductors residing anywhere upon said rotor.

One embodiment of the motor employs a plurality of "elliptical" rotors mounted upon the same output shaft, but positioned such that each rotor section is advanced a certain number of mechanical degrees from the others such that torque production over 360 degrees of rotation is shared equally by the number of rotors utilized. The motor also has a plurality of pole sets and separate magnetic circuits, such that each elliptical rotor section is associated with its own external source of magnetic flux, regardless of the fact that they share a common output shaft. Accordingly, the salient stator pole projections will all reside in the same plane and be parallel to each other, while the rotor sections will be displaced upon the output shaft by predetermined mechanical angles; 90 degrees for two pole sets, 120 degrees for three pole sets, etc. Those skilled in the art will realize that this arrangement may be reversed without departing from the spirit of the invention. Likewise, those skilled in the art will also realize that it is possible to construct a single, standalone, motor utilizing a single rotor and stator section.

Figure 5:
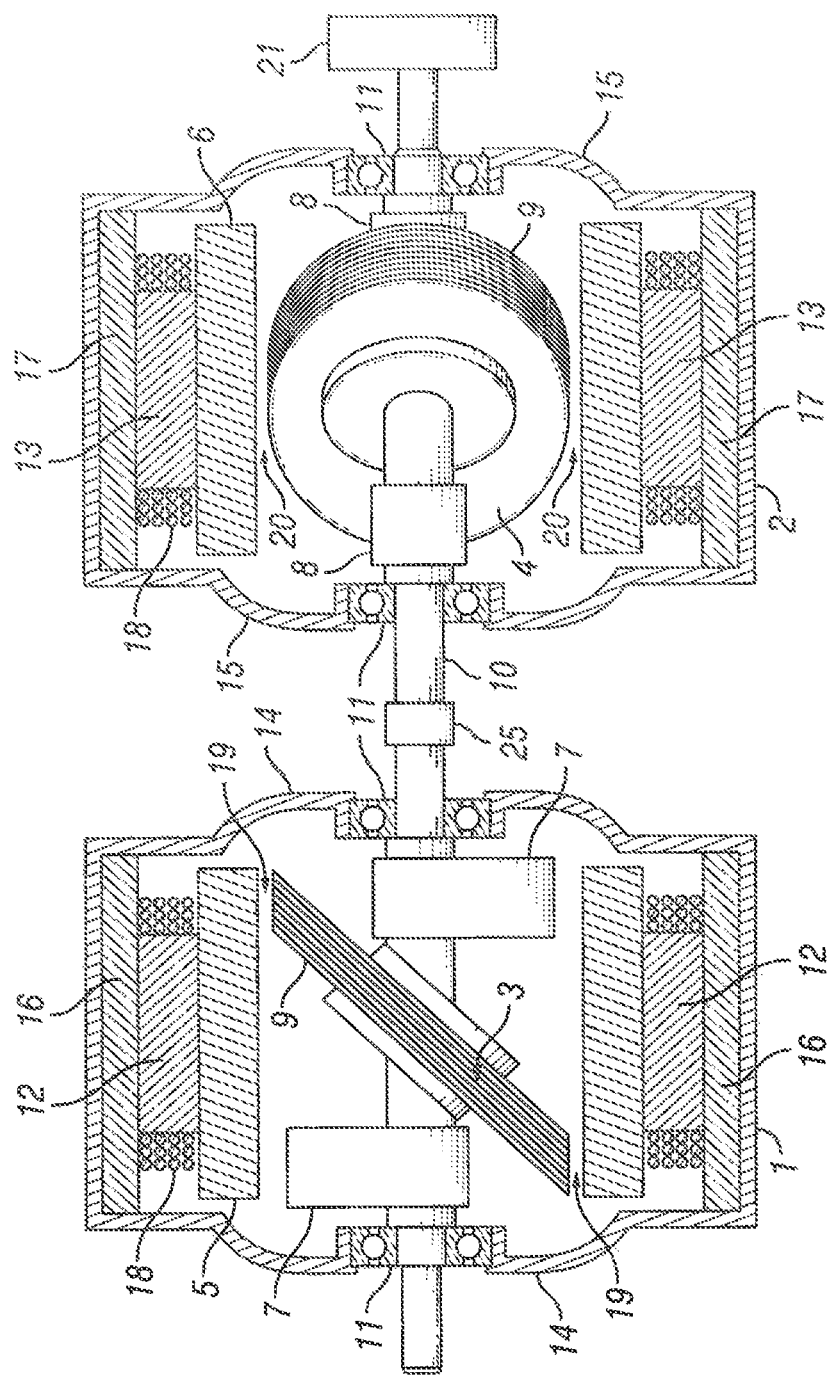
FIG. 5 is an overall view of one embodiment of the invention, showing stator sections in cut-away views revealing the disposition of bearings, common output shaft, rotor assemblies, counter weights, stator power windings and stator laminations.

Referring now to FIGS. 5 and 7, which each depict the relationship of the rotors to the stators, it will be noted, that the left hand rotor is positioned between the salient poles of its stator such that its oblique length presents the longest possible path to the magnetic flux produced by the associated pole set. The right hand rotor on the same shaft, will simultaneously present its shortest cross sectional path to its associated pole projections.

Sensing this arrangement, the shaft position sensor (21) will cause the controller (22) to energize starting windings (not shown) which will rotate the motor shaft in the desired direction, while simultaneously sending a current pulse into the left hand pole set depicted in FIG. 5. Those skilled in the art will understand and appreciate how starter windings are implemented to start a motor in the desired rotational direction.

The appearance of lines of force within the first rotor segment will cause a twisting action upon that rotor's lamination stack, such that torque is produced upon the motor output shaft in the desired direction. At the same time, the right hand rotor is rotated, by the turning shaft, into a position of readiness with respect to the right hand magnetic pole set.

Figure 8:
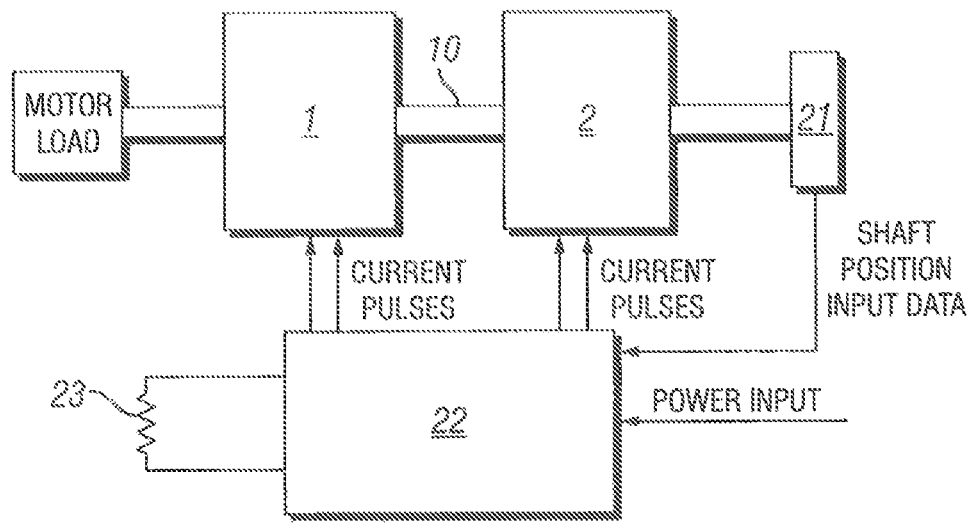
FIG. 8 is a block diagram of an exemplary motor system, depicting forward and rear motor sections, the motor load, the shaft position sensor, the electronic controller and the sump resistor in accordance with some embodiments.

The shaft position sensor (21), illustrated in FIG. 8, then signals the controller (22), which directs a current pulse into the second stator pole set, advancing the output shaft by another 90 degrees. Utilizing this means, each motor half is alternately energized and a complete revolution of the shaft is achieved with every four electrical pulses. Thus a 900 RPM motor will require: 4 Pulses/Rev×900 Rev/Min.=3600 Pulses/Min supplied from the controller's power supply.

The average torque available on the motor output shaft will be a function of the cooperative effort developed by both rotors over each mechanical revolution. The output torque developed by this method is strictly a reluctance torque, generated as the lines of magnetic flux within each rotor section alternately shrink in an attempt to provide themselves with the shortest possible magnetic path between poles.

It is important to realize that this torque-producing mechanism does not involve any interaction of either stator's magnetic field with a current carrying conductor of any kind, neither in the form of a Speed Voltage interaction, nor in the form of a transformer coupling with a time-varying field. Instead, the torque appearing on the motor shaft is a direct function of the rotor's geometry interacting with forces produced at the boundaries between the rotor body and the stator poles, and by internal cam action particular to the rotor geometry in the presence of a contracting flux.

Magnetic energy stored in the stretched lines of flux between each pole set must be dissipated as each field structure collapses in response to instructions from the controller. This will ensure that an "empty" inductor will be available at the start of each 90 degree cycle. Accordingly, fly-back diodes are provided in association with each power winding. The diodes direct pulses generated by the collapsing fields into a sump or load resistor (23), where they may be harmlessly dissipated as excess heat. Alternatively, said energy may be used to power other electrical appliances external to the motor, or may be applied to a capacitive storage element and then utilized to send power back to the main power supply.

Efficiency and Scaling

Because of the rotor geometry, in conjunction with the fact that this type of reluctance motor carries no rotor windings, at least 50% of the I squared R losses, stray copper losses, and hysteresis losses experienced by traditional motor technology will be avoided in accordance with the spirit of invention.

Energy savings of this magnitude are possible primarily because of the constant air gap afforded by the rotor's geometry. However, it should be remembered, that any electromagnetic device so designed as to prevent a large change in the reluctance of its magnetic circuit, while ensuring a constant air gap during the course of any mechanically sponsored alteration in the mean circuit length, shall experience only minute variations in inductance. The operational benefits of such an arrangement will be that any force produced or work done by the electro-mechanical process, will have a minimal effect upon the magnetic excitation current.

Additionally, the use of high frequency switching technology to develop the required pulses of drive current, will ensure that conversion efficiency, or the transformation from electrical power to mechanical power, will be attainable in the high 90 percentile range.

Application of concepts herein disclosed may be arranged such that the rotor segments may be joined either in series, as depicted in FIG. 5, or in parallel, such that each rotor is equipped with a gear upon its output shaft, and several such assemblies are situated so as to drive a common gear and a main output shaft, or with single rotors in multi-pole embodiments. This adaptability is possible in series and parallel arrangements.

The scaling of these embodiments is relatively straightforward. Accordingly, no unusual difficulties are anticipated in producing small, medium or very large sized motors of this design.

In another embodiment, an electric motor cluster comprises several stator sections each possessing a minimum of two salient pole projections, wound with power windings, and each having a single armature rotor. Each individual rotor is angularly displaced one from the other, while mounted upon a common frame, and geared together such that each motor section contributes to the rotation of a common output shaft. Those skilled in the art will also recognize that it is possible to deploy a single, standalone, motor with a single rotor and stator pair rather than as part of a cluster.

Such an arrangement not only allows for the combining of motor output powers and the removal of flutter from the final mechanical output, but simultaneously allows for a large increase in output torque by virtue of the necessary reduction gearing. The embodiment suggested within this particular disclosure lends itself perfectly to applications within the field of electric vehicle propulsion, particularly in those cases where the prime mover is to be located within the wheels of the vehicle. However, other applications are easily envisioned.

Each motor section shall consist of stator and armature elements as described in PCT application number PCT/US09/46246, filed on Jun. 4, 2009, and entitled "PULSED MULTI-ROTOR CONSTANT AIR GAP RELUCTANCE MOTOR." The motor may consist of the following features:

A stator, consisting of a stack of laminations, or a molded ferrite core, so constructed as to provide at least one set of salient magnetic poles, spaced apart 180 mechanical degrees, and situated so as to allow an air gap to exist between the stator structure and the armature of the motor. Each salient magnetic pole projection may be wound with power windings, the function of which is to produce a magnetic field of considerable strength, and direct the same through the air gaps and into the body of the motor's armature.

An armature, also consisting of a stack of laminations, or a molded ferrite shape, so designed as to present each set of field poles with a cylindrical contour, perceived beyond each air gap, while retaining an elliptical profile with respect to the output shaft. The armature sections carry no electrical windings of any kind, and require no slip rings or, field coils or permanent magnets. However, armature segments may require shaft-mounted counter weights to offset their eccentricity, and maintain angular balance during rotation.

The power windings wound upon the salient pole projections, are energized by pulses of electric current produced by a DC power supply and provided through an electronic controller unit, or through a mechanical commutator, etc. The pulses are automatically applied to the salient pole nearest the longest flux path available through a particular rotor section, as determined by a shaft position sensor, or the geometry of a commutator.

The appearance of flux lines linking any stator pole set and any armature section immediately causes a rotation of the motor's output shaft by 90 mechanical degrees as the flux lines seek to establish the shortest possible path available for the completion of their magnetic circuit within a given motor.

This action is transmitted to the main output shaft via a large reduction gear, thereby increasing the available torque. In the motor cluster embodiment disclosed herein, several motor sections are positioned such that each may contribute to a common mechanical output. However, several such motor sections may be energized simultaneously, thereby increasing the output power in multiples.

Upon detecting motion, the shaft position sensor communicates the change in position of the output shaft to the electronic controller, and current flow is then terminated in each active stator section, and instantly initiated in the stator section windings next scheduled to be activated. By means of such switching action, which occurs at even intervals of mechanical degrees, a constant rotary motion is ensured.

FIGS. 9-13 illustrate one embodiment of the motor cluster disclosed herein. Reviewing FIG. 9, it may be seen, that each motor section consists of a metallic housing 1 containing a stator stack 16 and an armature assembly 3, which is mounted upon an output shaft 10, which is carried by two sets of bearings 11, located within end bells 14.

The rotor assembly 3 within each motor section, consists of a stack of silicon steel laminations 9, or a molded ferrite of appropriate shape, or any other high permeability magnetic material designed to suppress eddy currents, machined so as to produce a section of a right circular cylinder canted at an angle of 45 degrees with respect to the motor output shaft 10. When viewed face on, the rotor structure appears to be circular in shape. However, the side view depicts an ellipse tilted at 45 degrees. This angle may not be the most optimal angle, and it should be realized that other angles may be employed without departing from the spirit of the invention.

Figure 9:
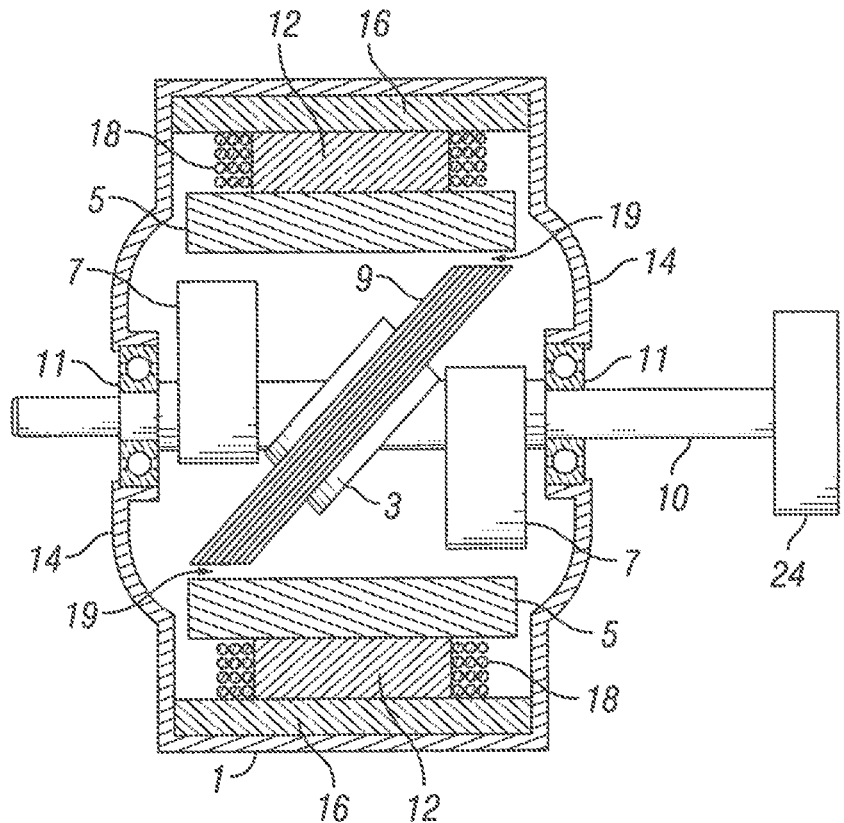
FIG. 9 is a diagram of a single-rotor with a constant air-gap in accordance with some embodiments.

Each motor shaft 10 may also carry counter weights 7, as depicted, which function to ensure a smooth rotary motion by suppressing mechanical vibrations produced by the mass distribution of the eccentric armature design 3. Each motor shaft carries a high speed output pinion 24 which designed to mesh with the main output gear as shown in FIGS. 9 and 10.

Each stator assembly contains an individual stack of stator laminations 16 or a magnetic ferrite cylinder, from which extend two or more salient pole projections 12, each of which is wound with a power coil 18. The face of each pole projection 5 is extended to the right and the left of center to ensure continuous air gaps 19 of constant dimension. The pole faces are aligned parallel to the rotor's edge contour regardless of its angular disposition. Those familiar with the art will realize that it may be possible to install more than two pole projections in association with each armature without departing from the spirit of this invention.

Figure 10A:
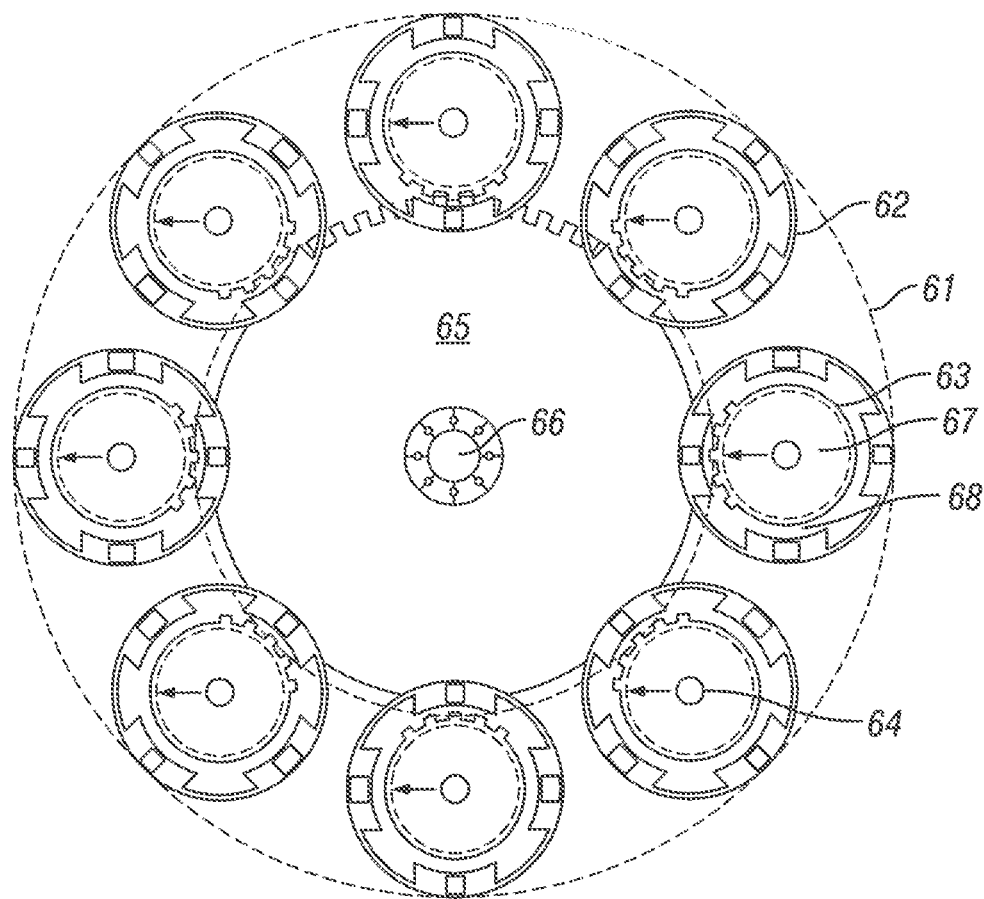
FIGS. 10A and 10B, respectively, are diagrams illustrating and end view of a parallel output cluster of motor sections such as the one shown in FIG. 9, and a side, cut-away view of a single motor unit of FIG. 10A in accordance with some embodiments.
Figure 10B:
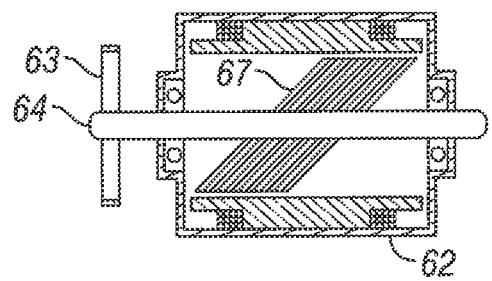

Referring now to FIG. 10, the concept of the parallel motor cluster will become apparent in greater detail. The embodiment depicted makes use of eight individual motor elements numbered clockwise, M1 through M8, starting at the 9:00 o'clock position. The motor elements are mounted at 45 degree intervals upon a circular frame 61. Each motor element consists of a laminated, four pole stator stack 62, an air gap 68, an elliptical rotor 67, an individual motor output shaft 64, and an output pinion 63. Further, it will be noted, that each output pinion is in mesh with a central output gear or "bull gear" 65 which drives the main output shaft 66.

Figure 11:
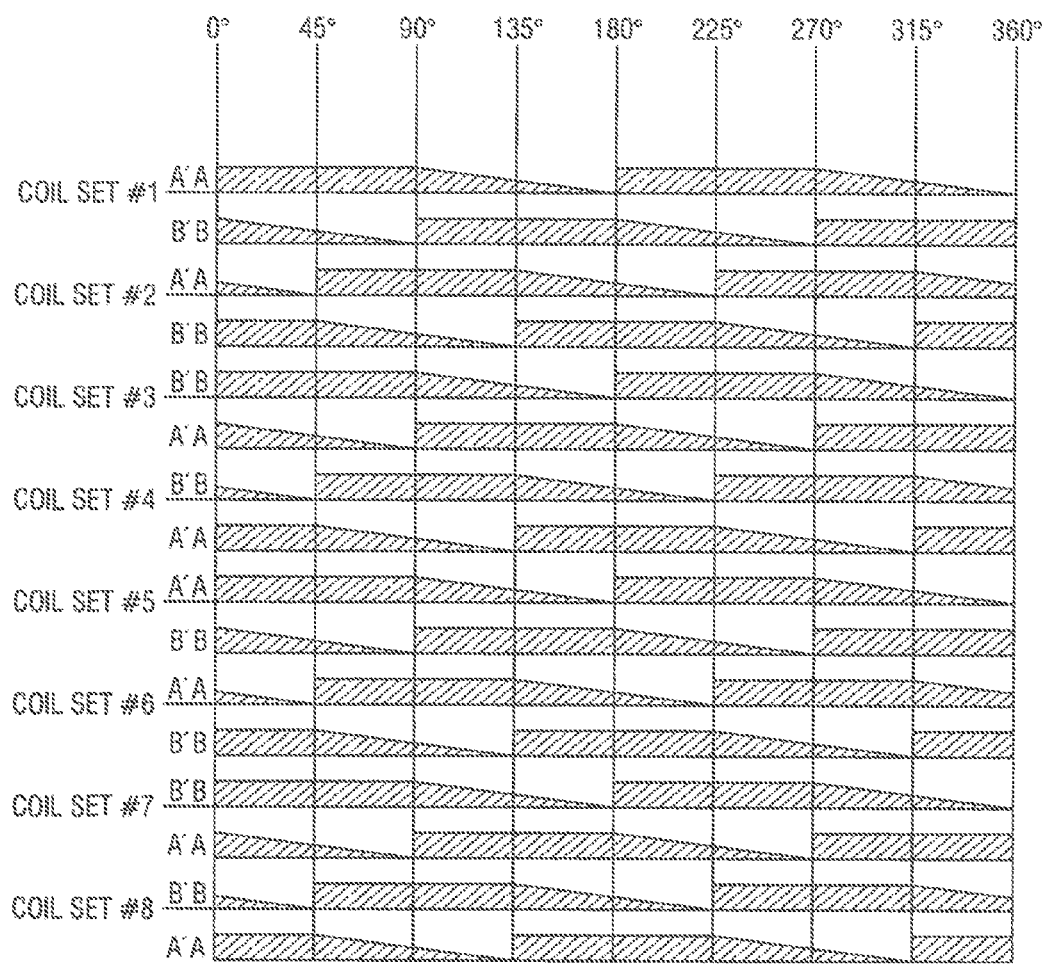
FIG. 11 is a motor coil energizing scheme for the motors of FIG. 10 in accordance with some embodiments.

This arrangement allows for four motors to be energized at any one time, with power overlaps and torque-sharing occurring at 45 degree intervals. This feature serves to smooth out the total torque delivered to the output shaft, allowing for a more continuous delivery of power, as each contributing motor develops its output torque out of phase with respect to each of the others. Total motor action during operation may be appreciated by studying the coil energizing truth table depicted in FIG. 11, while the power coil interconnection schematic may be reviewed in FIG. 12. In FIG. 11, the horizontal portions of each chart depict energized coils and the sloped portions of the chart represent the magnetic reset of the energized coils. There are shown coil sets for eight motors as described in the above text with respect to FIG. 10.

Figure 12:
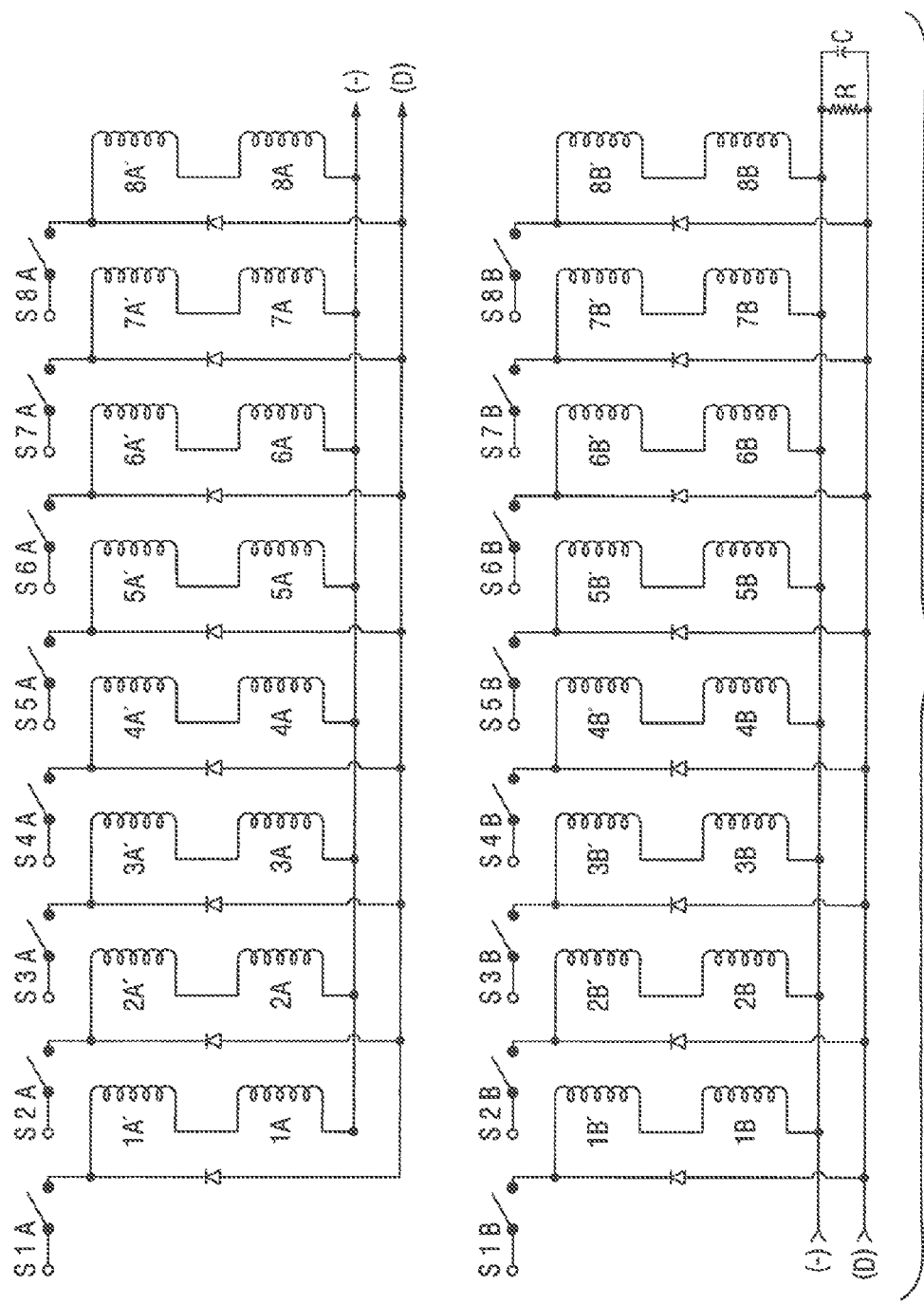
FIG. 12 is a schematic of coil interconnections for eight motor sections mechanically connected in parallel in accordance with some embodiments.

Referring now, to FIG. 12, it will be noted that switches S1A through S8A, and switches S1B through S8B, are used to control the power winding coil sets in each motor section. The coil sets are labeled A, A' and B, B' for each motor as shown in FIG. 10. These switches are schematically accurate, but may represent either solid state switching devices located within the electronic motor controller, or actual contact bars located upon a more traditional commutating device. These distinctions are more clearly explained in FIG. 13.

Figure 13A:
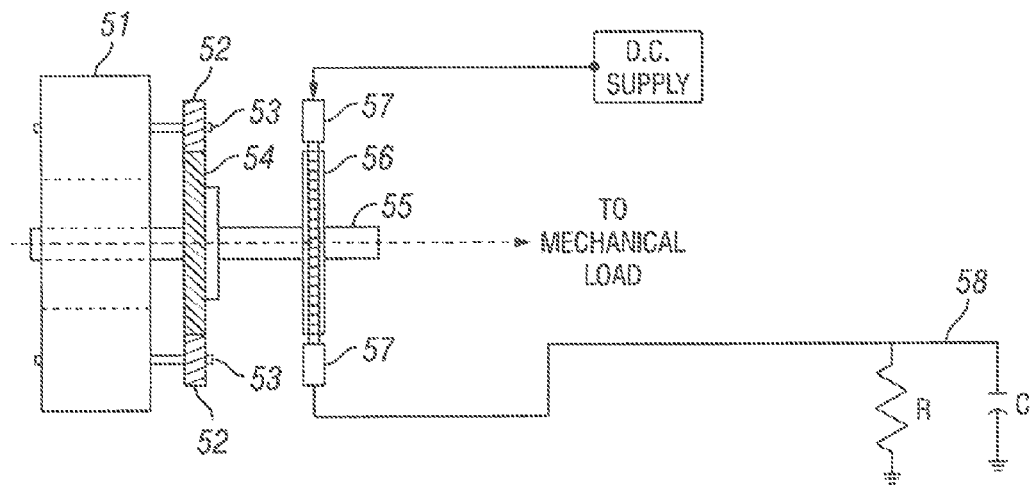
FIG. 13A is a diagram of a motor cluster having brushes and commutator for timing in accordance with some embodiments.
Figure 13B:
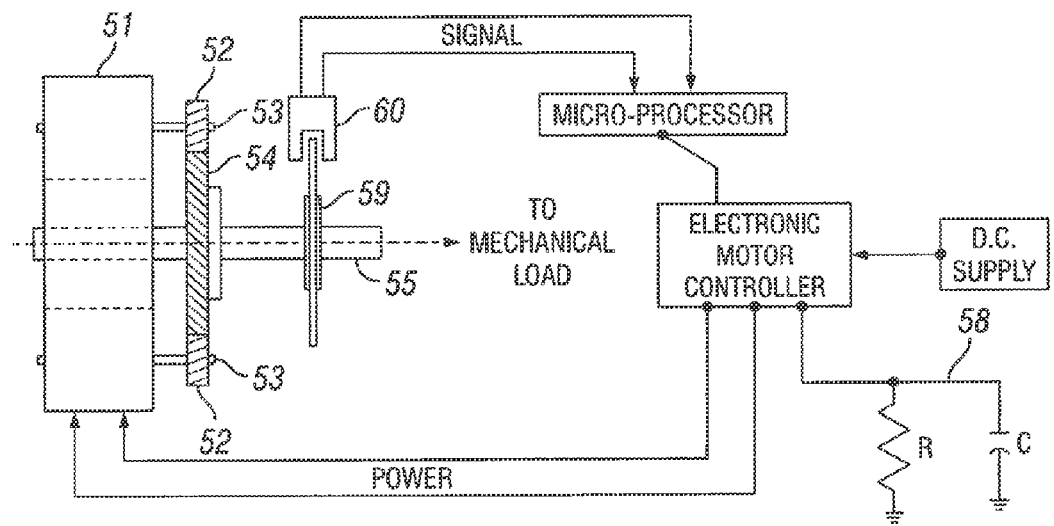
FIG. 13B is a diagram of a motor cluster having an optical encoder for timing in accordance with some embodiments.

FIGS. 13A and 13B depict two variations of some embodiments of the present invention. FIG. 13A demonstrates the parallel motor cluster concept employing a traditional electro-mechanical commutating device 56, 57, while FIG. 13B demonstrates a more modern approach employing a shaft-mounted encoder 59, a micro-processor, and an electronic motor controller. It will be noted, that both systems require a source of DC power, as well as a capacitive power sump 58, into which excess "inductive energy" is directed. This "sump" may be equipped with a resistive load, which will consume said inductive energy, or the accumulated potential may be utilized to supply other worthwhile power requirements.

Returning now to FIGS. 13A and 13B, it will be noticed that each arrangement contains a motor cluster housing 51, a plurality of high speed motor pinions 52 mounted upon individual motor output shafts 53, and a central bull gear 54 mounted upon a main output shaft 55. However, FIG. 13A makes use of a mechanical commutation device 56 with standard carbon brush contactors 57, while the device shown in FIG. 13B employs a shaft encoder 59 and an encoder pick-up device 60.

Observing FIG. 13B, it will be noted that electronic signals obtained from the encoder assembly are transmitted to the micro-processor and the electronic motor controller, while power pulses are independently directed to individual motor windings via output conductors energized by the motor controller. Alternatively, the arrangement shown in FIG. 13A accomplishes these functions electro-mechanically, which may be advantageous in situations requiring the control of electric power greater than can be managed by present day solid state switching devices. Ultimately, however, both systems produce the results depicted in FIG. 11, and both systems ultimately direct inductive energies from collapsing magnetic fields into the capacitive sump indicated by network 58.

It should be understood that the embodiment discussed in this application and depicted in associated FIGS. 9-13, are for illustrative purposes only, and that those having skill in the electrical arts will understand that modifications and alterations can be made hereto, within the spirit of the present invention including but not limited to variations in the number of motors comprising the motor cluster.

As discussed previously, the parasitic effect of Back EMF, and motors designed to exploit Speed Voltage (Vs), imparts several drawbacks to existing systems. At least in part to avoid these and other drawbacks, the presently disclosed systems and methods are designed to operate on the production of Transformer Voltage (Vt). As disclosed herein, at least one advantage of such a design is that it allows the energy associated with the magnetic field to be re-captured and, in great measure, re-utilized.

To exploit the Transformer Voltage (Vt) instead of the Speed Voltage (Vs), the presently disclosed systems and methods implement the following two design principles arising out of the above discussion, and an understanding of the importance of equation 6 above. The first design principle implemented to exploit Transformer Voltage (Vt) is to introduce a parameter dl/dt corresponding to the change in magnetic circuit length over time. The second design principle is that to minimize the Speed Voltage (Vs) component the relation provided in equation 8 must be zero, or nearly zero. One way to accomplish a nearly zero Speed Voltage (Vs) is to minimize dL/dt by designing the air gap to be constant. These two design principles are described in greater detail below.

Figure 14A:
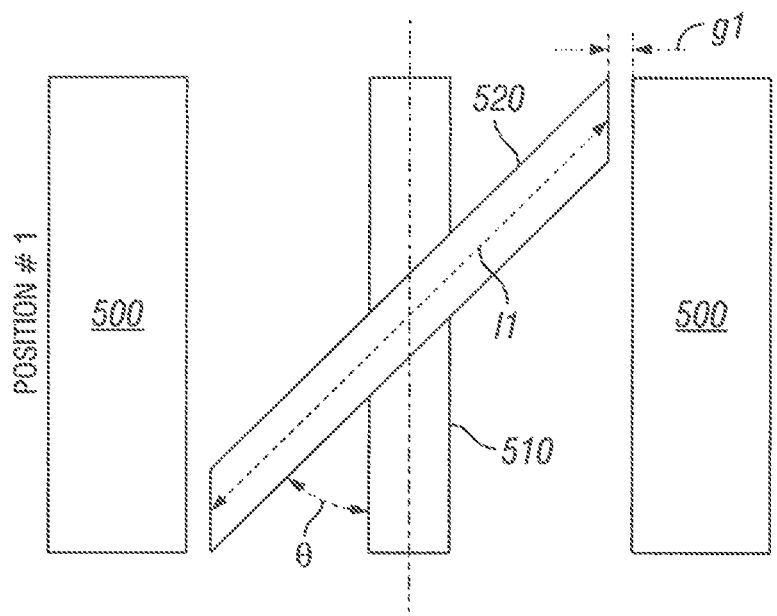
FIGS. 14A and 14B are schematic cut-away views of a rotor and stator pole pair in accordance with some embodiments of the invention.

The consideration of the change in magnetic circuit length over time (de/dt) can be described with reference to FIGS. 14A and 14B which are schematic cut-away views of a rotor and stator pole pair in accordance with some embodiments of the invention. As shown in FIG. 14A, stator poles 500 form a pair on either side of rotor shaft 510. Magnetically conductive rotor stack 520 is mounted on shaft 510 and depicted in a first position in FIG. 14A. In the embodiment depicted, rotor stack 520 may comprise a shape that is designed to present a substantially cylindrical profile when rotated about shaft 510. For example, and as described in more detail below, rotor stack 520 may comprise a substantially elliptical shape that is mounted on shaft 510 in an offset, or canted, fashion forming an angle θ with respect to the shaft 510 as best seen in FIG. 14A. As also depicted, in the position shown in FIG. 14A, rotor stack 520 forms an air gap of distance g1 with stator poles 500. The magnetic circuit formed by the stator poles 500 and rotor stack 520 can be calculated from adding the air gap to the major-axis length $l_1$ of the rotor stack 520 as follows:

FIG. 14A magnetic circuit length=$g1+l_1+g1=2g1+l_1$.

Figure 14B:
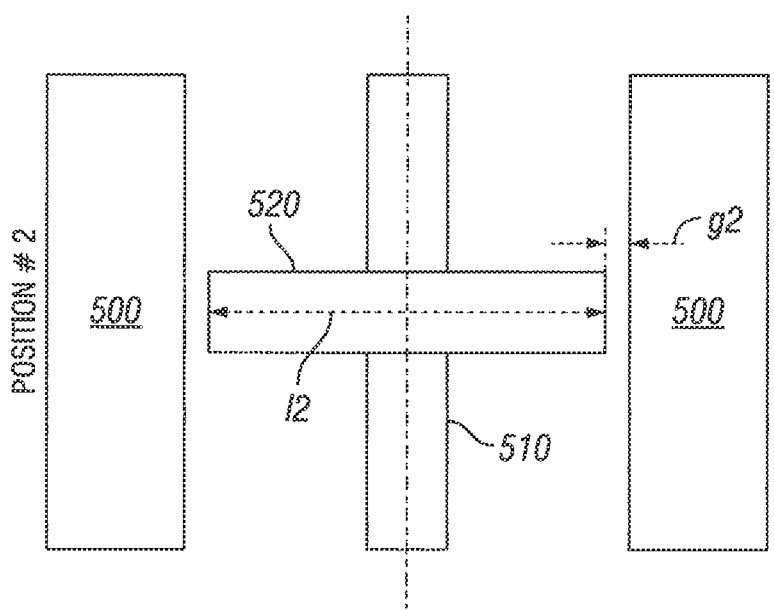

FIG. 14B shows a cross sectional view when the rotor stack 520 is rotated one-quarter turn (i.e., 90 degrees) from the position shown in FIG. 14A. As shown by comparison with FIG. 14A, and by design, the air gap in the FIG. 14B position (g2) between rotor stack 520 and stator poles 500 remains constant (i.e., g1=g2), however the length of the magnetic circuit in FIG. 14B is now a factor of the rotor stack 520 minor-axis and can be calculated as:

FIG. 14B magnetic circuit length=$g2+l_2+g2=2g1+l_2$.

Therefore, by design, when the shaft 510 rotates, the magnetic circuit length will vary in time between a maximum proportional to $l_1$ and a minimum proportional to $l_2$. Furthermore, as the dimension of the air gap does not change (i.e., g1=g2), the contribution of dL/dt is zero, and the Speed Voltage component is, by design, zero as well.

The following is a closer examination of the effect of the new parameter, de/dt, or a change in magnetic circuit length with respect to a change in time in accordance with the disclosed inventions. Beginning from the classical formula for inductance (equation 13):

$L = (N^2 \mu A)/(Kl)$, where N is the number of turns, μ the permeability, A the cross-sectional area, l the magnetic circuit length, and a K constant of proportionality. In most inductance calculations, all of the above parameters are usually considered to be constants. However, as explained above, in the presently disclosed embodiments the length of a magnetic circuit changes in time. Accordingly, it is interesting to examine the magnitude of the resulting change in inductance using the following values determined experimentally by the above-named inventor.

In one embodiment, measuring a mean magnetic path around the stator equivalent to the mean circumference Cm, gives 43.982 inches in length. A major axis for a rotor stack 520 of 14 inches long gives the total circuit length $l_1$=57.982 inches. As discussed in connection with FIG. 14B, rotating the rotor stack 520 by 90 degrees, changes to the minor axis of the rotor stack 520 and also provides an overall circuit length $l_2$=55.486 inches. Substituting and calculating corresponding values of inductance using equation 13 above gives:

$L_1$=0.103480 Henrys, and $L_2$=0.104346 Henrys.

The difference of these two values ΔL is calculated to be $8.666 \times 10^{-4}$ H, and when this change occurs in one quarter of a rotation at 60 HZ, a measured Back EMF of 2.5 Volts results. This is a remarkable result, considering the fact that a change of the same degree within the air gap of a conventional Speed Voltage based motor generates hundreds of volts of Back EMF.

Figure 16:
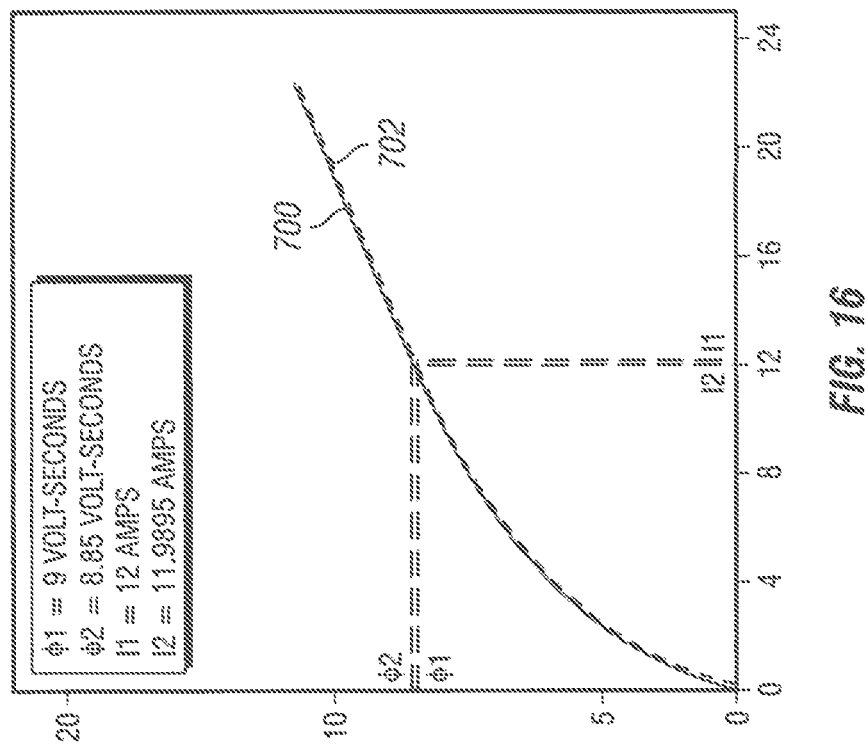
FIG. 16 is an illustration of the non-linear curves representative of the flux behavior as measured within a structure of electrical steel of the constant air gap motor of the instant disclosure (e.g., FIGS. 14A-14B).
Figure 15:
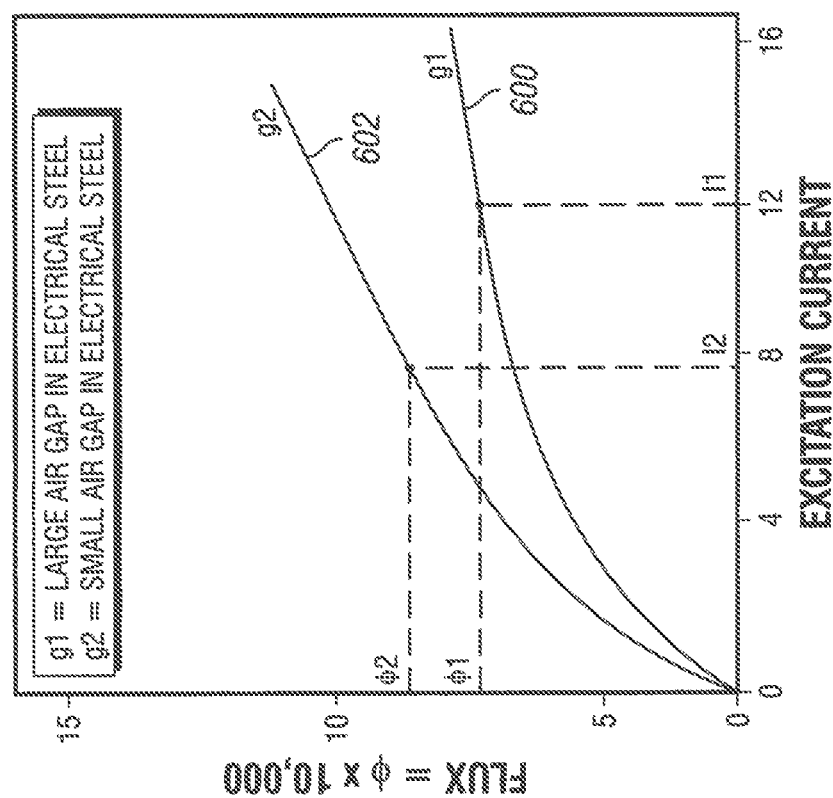
FIG. 15 is an illustration of the non-linear curves representative of the flux behavior as might be measured within a structure of electrical steel of a prior art motor with a variable air gap.

To illustrate the significance of the above result, we compare FIG. 15 and FIG. 16. In the manner of linear energy for an air gap shown in FIG. 3, FIG. 15 shows the non-linear curves representative of the flux behavior as might be measured within a structure of electrical steel of a prior art motor with a variable air gap. As shown, plots 600 and 602 are continuous, but quite non-linear. This is to be expected, because here, as in the case of B/H curves, the permeability (μ) is not constant.

In correlation with the FIG. 3 air gap example, the following calculations illustrate the changes observed in this steel sample as the associated air gap changes from its g1 dimension to its g2 dimension. Again, starting from equation 11, $E_T = I\, d\Phi + \Phi\, dI$.

For the values shown on FIG. 15, for a gap size of g1: I=12 amps, $d\Phi_1$=3.202, and $dI_1$=8.23. Therefore, $E_{T1}$=(12)(3.202)+(8)(8.23)=104.26 Joules. For a gap size of g2: I=7 amps, $d\Phi_2$=3.475, and $dI_2$=5.4535. Therefore, $E_{T2}$=(7)(3.475)+(9)(5.4535)=73.406 Joules.

Unlike the air gap calculation corresponding to FIG. 3, here each energy component is different in value, as might be expected. However, note that the total energies, $E_{T1}$ and $E_{T2}$, are not equal in this case. There is a substantial difference of 30.86 Joules.

The contrasting, and unexpected result of the present invention is shown in FIG. 16, which is an illustration of the non-linear curves representative of the flux behavior as measured within a structure of electrical steel of the constant air gap motor of the instant disclosure (e.g., FIGS. 14A-14B). Calculating again using equation 11, for the rotor stack 520 in the first position (FIG. 14A): I $d\Phi_1$=(12)(3.475)=41.70 Joules, and Φ $dI_1$=(9)(5.4535)=49.08, and $E_{T1}$=90.78 Joules as shown by plot 700. For the second position (FIG. 14B): I $d\Phi_2$=(11.98)(3.475)=41.63 Joules, and Φ $dI_2$=(8.85)(5.4535)=48.26 Joules, and $E_{T2}$=89.89 Joules as shown by plot 702. Accordingly, the difference in energies is 0.89 Joules.

As demonstrated above, the difference in behavior here is very distinct from conventional systems: a small decrease in current (I), and an equally small increase in flux (Φ). This can only be possible without the presence of a speed related Back EMF. Accordingly, it stands to reason that the energy usually associated with the Speed Voltage (Vs) has been reduced to a value that cannot possibly support the measured shaft horsepower. However, because the primary relationship for energy in this system is:

$$I\Phi = Ef + Ec,$$

it also stands to reason that if the co-Energy factor is reduced, and Field Energy remains constant, then there must have been a change in the supply energy. This can be understood by looking at the power involved, rather than from the energy domain. Recalling that the total applied voltage is the sum of the voltage drops around the equivalent motor circuit, we can write:

$$d\Phi/dt = LdI/dt + IdL/dt,$$

where $di/dt$ is the source voltage, $L\, dI/dt$ is the Transformer Voltage (Vt), and $I\, dL/dt$ is the Speed Voltage (Vs). Substituting V for $d\Phi/dt$, we obtain:

$$V = LdI/dt + IdL/dt.$$

However, the actual source voltage is the sum of Vt, Vs and Vr, so we must modify the above expression accordingly, thus obtaining:

$$(Vt + Vs + Vr) = (LdI/dt) + (IdL/dt) + Vr.$$

Because Watts are the product of Volts and Amps, the above expression is now multiplied by I to get:

$$(Vt + Vs + Vr)I = I(LdI/dt) + I(IdL/dt) + IVr.$$

From Ohm's law we know that Vr is actually equal to Ir, thus we may substitute:

$$(Vt + Vs + Vr)I = I(LdI/dt) + I(IdL/dt) + I^2 r.$$

Thus, we finally arrive at an expression in Watts which represents the motor in question.

Recalling the fundamental nature of equations it is obvious that whatever we change on one side of the equal sign, we must change on the other side to maintain a mathematical balance. Accordingly, Vr I must equal Ir as the motor losses are constant. If the Speed Voltage parameter I(I dL/dt) is reduced almost to zero, because of rotor geometry and a constant air gap, then it stands to reason that its supporting component (Vs) in the source voltage must also be reduced by the same proportion. This must be so if power, and its associated energy, are to be conserved. Accordingly, it now becomes apparent that the Back EMF is a parasitic agent, the presence of which demands a higher source voltage to perform the same work; Back EMF is a system loss. However, this kind of loss only destroys potential, it does not evolve heat, therefore, it has gone unnoticed until now.

Another unexpected consequence of the presently disclosed technology resides in the fact that the reluctance torque is not affected. The torque generating mechanism does not care if it is supported by the field energy or the co-energy, it simply responds to the presence of flux according to the formula:

$$T = -\tfrac{1}{2}\Phi^2 dR/d\theta.$$

Figure 4A:
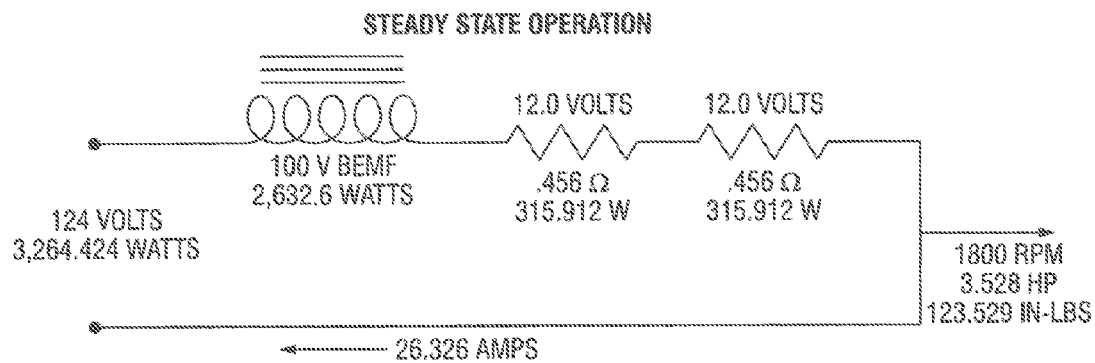
FIGS. 4A and 4B are equivalent schematic circuits for a prior art DC motor illustrating the steady-state and in-rush operation circuit values.
Figure 4B:
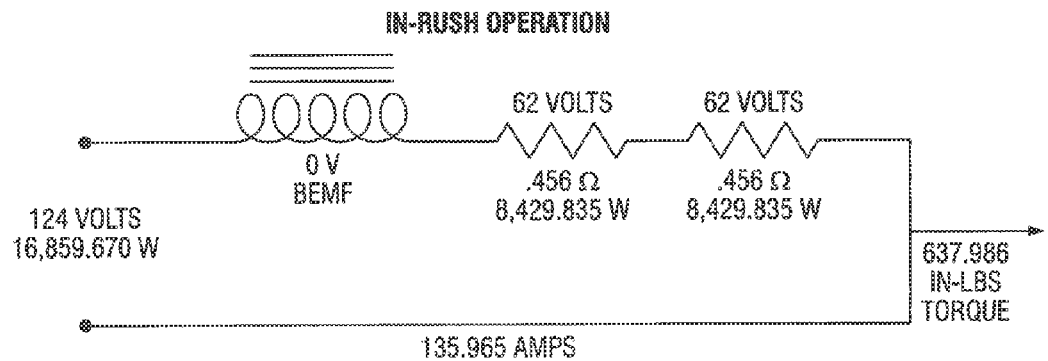

As noted above with reference to FIGS. 4A and 4B, Back EMF causes significant issues in the operational characteristics of a conventional motor. However, under the above-described and currently disclosed embodiments, Back EMF does not appear in the traditionally anticipated magnitude, but the motor still undergoes an acceleration. Thus, for exemplary purposes, using the values in FIG. 4A and calculating the characteristics while ignoring Back EMF the motor would develop 18.221 HP, or 13,592.866 shaft watts, and would require a total input power of 16,859.670 watts. Subtracting the shaft watts from the total input power, the figure of 3,266.804 watts is obtained. Dividing this number by the operating current of 135.965 amps, a potential of 24.02 volts is indicated. However, there is no place for such a voltage in the equivalent circuit diagram used to obtain this information; an indication that something is out of balance in the overall energy distribution. Speed Voltage cannot be missing, because it was stipulated at the start of these calculations that it did not exist. However, one candidate still remains, L dI/dt, or the Transformer Voltage. Checking this assumption is quite a straight forward matter. Using the relationship: V=I dL/dt, assuming an acceleration time of 6/10 seconds, and solving for L, a value of 0.1059 H is derived, which is very much in keeping with the inductance figures described above in connection with FIGS. 4A-4B. Therefore, Vs is not required to power the presently disclosed kind of motor, instead Vt is the driving agent.

The differences between Speed Voltage (Vs) dependent systems and Transformer Voltage (Vt) dependent systems are many and pronounced. The most pronounced difference between Vt and Vs lies in the inductive mechanism with which each potential is associated. Regarding the term I dL/dt, under dimensional analysis yields that dL/dt has the dimension Joule-seconds/coul$^2$, which is representative of a resistance. Hence, I$^2$ (dL/dt) is dissipative by its very nature, while the expression VI, from which L dI/dt is derived, can easily describe a reactive condition. Energy can be extracted from a reactive situation, but not from a dissipative relationship.

Figure 17A:
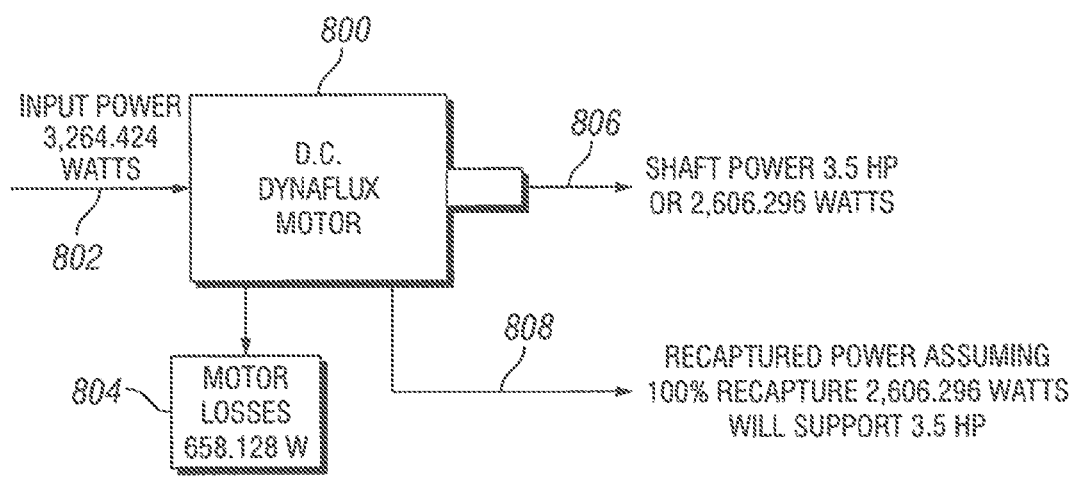
FIGS. 17A and 17B are schematic representations of a Transformer Voltage (Vt) dependent system in accordance with some embodiments of the present invention.
Figure 17B:
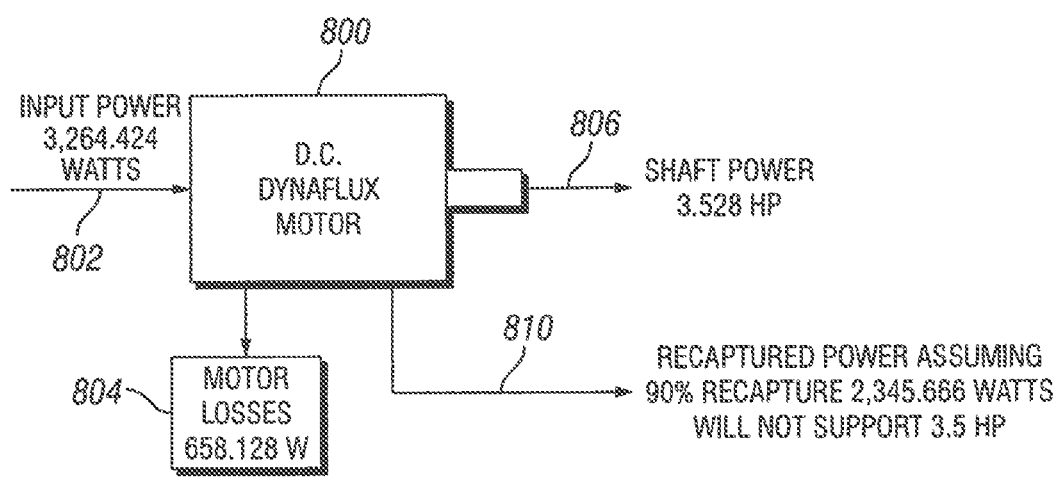

FIG. 17A is a schematic representation of a Transformer Voltage (Vt) dependent system in accordance with some embodiments of the present invention. As depicted, a DC motor 800 has a through-put efficiency of 79.84%, such that a power input 802 of 3,264.424 watts, minus system losses 804 of 658.128 watts, yields an output 806 on the shaft of 2,606.296 watts, or approximately 3.5 HP. Over and above this shaft output 806, the motor 800 supplies an electrical output 808 due to the re-capture ability associated with IVt. Assuming a theoretical 100% recapture is possible, then this output electrical power 808 has a maximum value of 2,606.296 watts. However, in practice, no process can be 100% efficient, and so, a more physically reasonable arrangement is displayed FIG. 17B where a recapture electrical output 810 figure of 90% is used. As shown in FIG. 17B, the power through-put from the electrical input 802 to the mechanical output 806 remains the same at 79.84%. However, the reclaimed "field energy" now delivers a useful electrical output 810 of 2,345.666 watts.

The recaptured electrical output 810 power is the same power that was applied earlier (e.g., 802), minus all the associated losses. In operation, the input power 802 pulse, and the recapture power 810 pulse cannot exist at the same time. They are 180 electrical degrees out of phase with each other.

Figure 18:
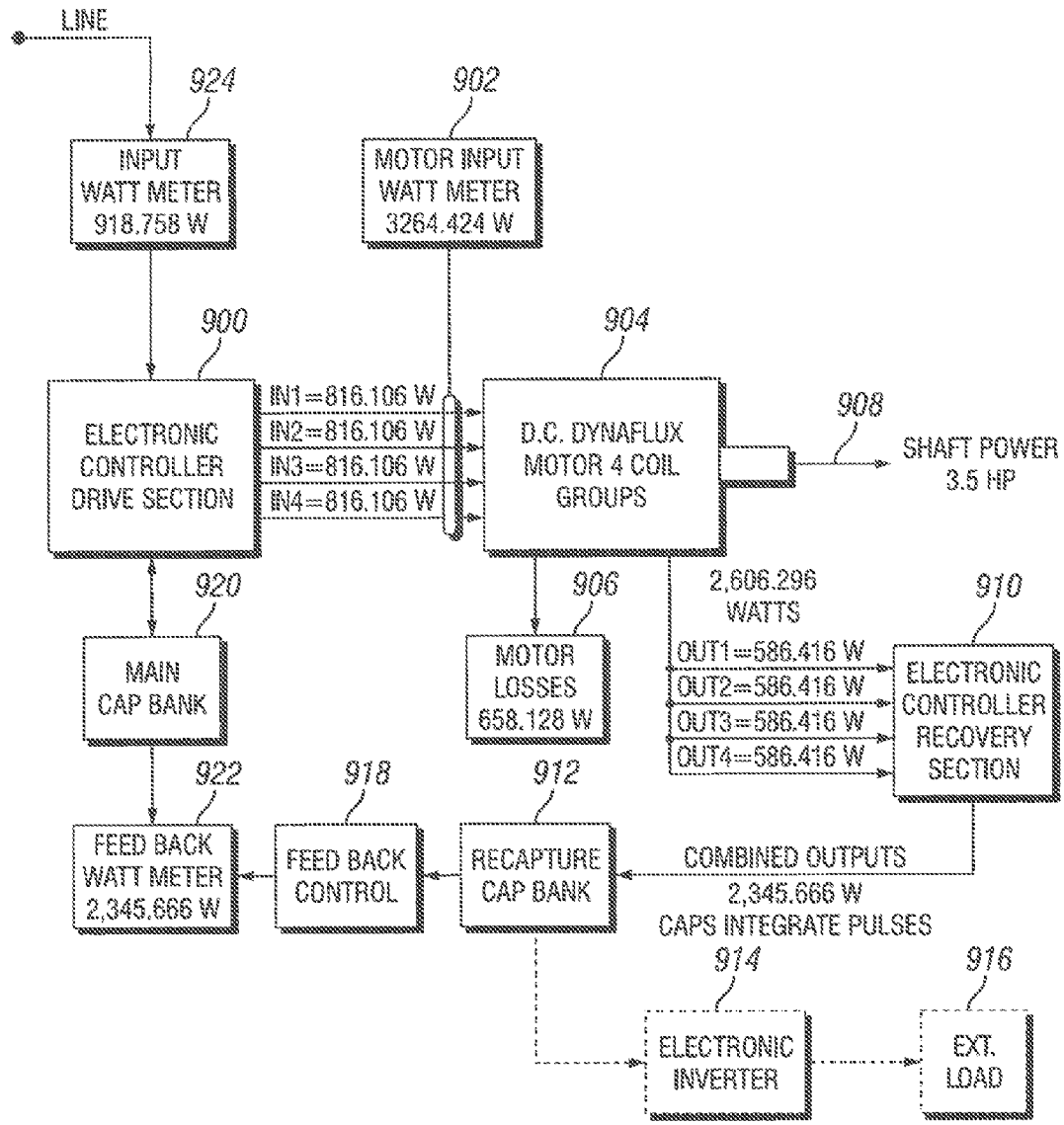
FIG. 18 is a schematic illustration of a motor system in accordance with some embodiments of the disclosed inventions.

FIG. 18 is a schematic illustration of a DC motor system in accordance with some embodiments of the disclosed inventions. As shown, the drive section of the electronic controller 900, in these embodiments, contains four field poles, and so the controller 900 issues four sequential pulses into the motor every 90 degrees, each pulse containing 816.106 watts. If it is desirable to measure, or otherwise monitor, these pulses, a meter 902 can be implemented as illustrated. In response to the input pulses from controller 900, motor 904 responds by rotating, and loses 658.128 watts in heat losses 906.

The output power 908 available at the motor 904 shaft, may be approximately 3.5 HP, and the overall motor efficiency may be 79.84%, as measured by contrasting total electrical input from controller 900 to the average mechanical output 908 at the shaft.

Almost simultaneously, each collapsing motor field produces an electrical output 909 of 586.416 watts, which represents the re-captured field energy. These pulses 909 are then delivered to the recovery section 910 of an electronic controller, and then may be stored, for example, in the re-capture capacitor bank 912. In some embodiments, energy from this capacitor bank 912 could be removed if necessary, and used to supply power to external appliances (shown in phantom at 914, 916.

As power pulses are delivered to the recapture capacitor bank 912, voltage across these capacitors will begin to rise. Once the potential reaches a certain pre-determined value, the feedback controller 918 may automatically start sending power back to the main capacitor bank 920. In some embodiments, the power delivered by this motor 904 operation may be monitored by the feedback watt meter 922.

A power accounting at this point demonstrates the subtle energy workings at play within this motor system:

(3,264.424 watts)−(Motor Losses=658.128 watts)= (shaft power of 2,606.296 watts);

(Recaptured power is 0.9×2,606.296)=(2,345.666 watts, sent to feed-back).

However, (3,264.424 watts)−(2,345.666 watts)=(918.758 watts), which represents a power shortage. Therefore, this amount must be drawn from an external power source, such as the utility line or source voltage 924. Because of the unique features of the disclosed embodiments, the system of FIG. 18 also yields the following efficiencies:

1.) Overall Motor Efficiency=79.84%; and
2.) Apparent System Efficiency=2,606.296 watts/918.758 watts×100%=283.676%.

While this apparent system efficiency is remarkable, it is understandable in view of the above explanation of Transformer Voltage (Vt) operation (and resultant lack of Back EMF). Furthermore, the system inputs and losses are as expected:

Motor Losses=658.128 watts;
Recapture Losses=260.630 watts; and
Total from Line=918.758 watts.

Thus, the line only supports the system losses, while the shaft power is supported by the change in field energy per unit time. As expected, the motor will not operate without line power.

As noted herein, the unique characteristics demonstrated by the disclosed motor, are the result of a special cooperation between the rotor design and the stator design. With respect to the stator, several design features are important. Therefore, the motor as disclosed herein may include combinations of the following features: an even number of salient stator poles, salient poles that are protected from flux movement in two directions, poles that are designed to be as short as possible, and pole windings should be of adequate wire size, but with as many turns as desirable.

Some reasons and advantages of the above-noted stator design features are the following. The even number of salient poles is advantageous in establishing the flux field to impart a force on the rotor, because each pole set constitutes a complete magnetic circuit for each phase, with two poles being the minimum set.

Figure 19A:
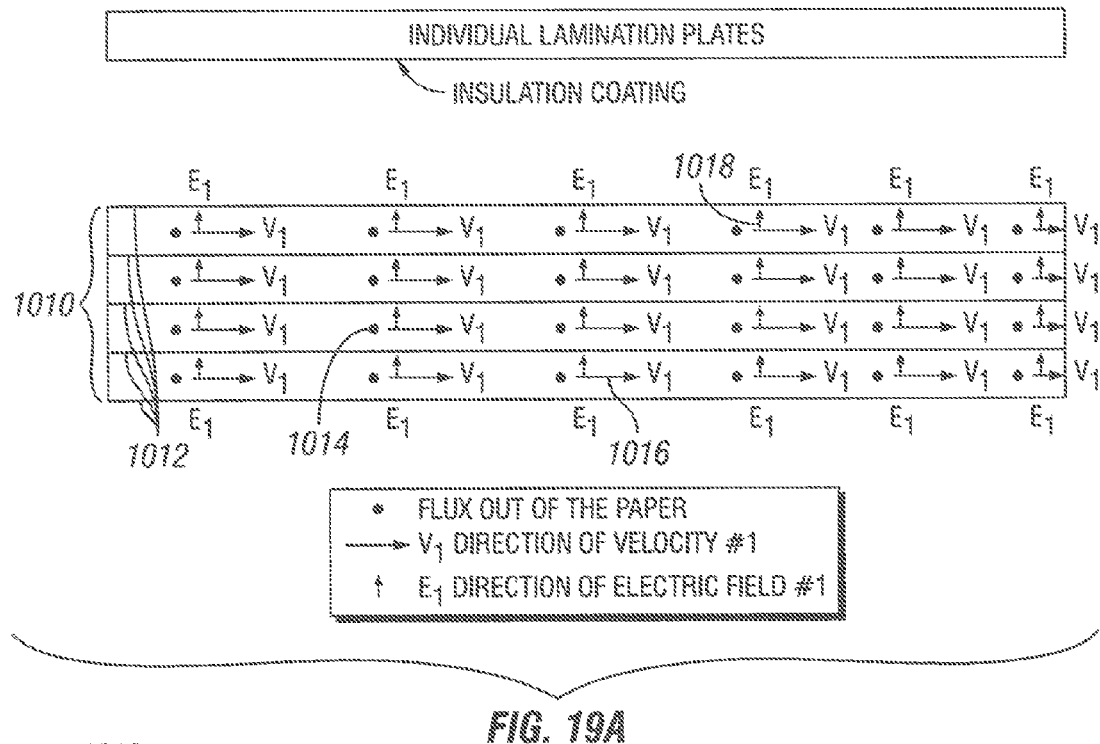
FIGS. 19A and 19B are schematic illustrations of magnetic flux, electric field, and velocity components within stator iron.
Figure 19B:
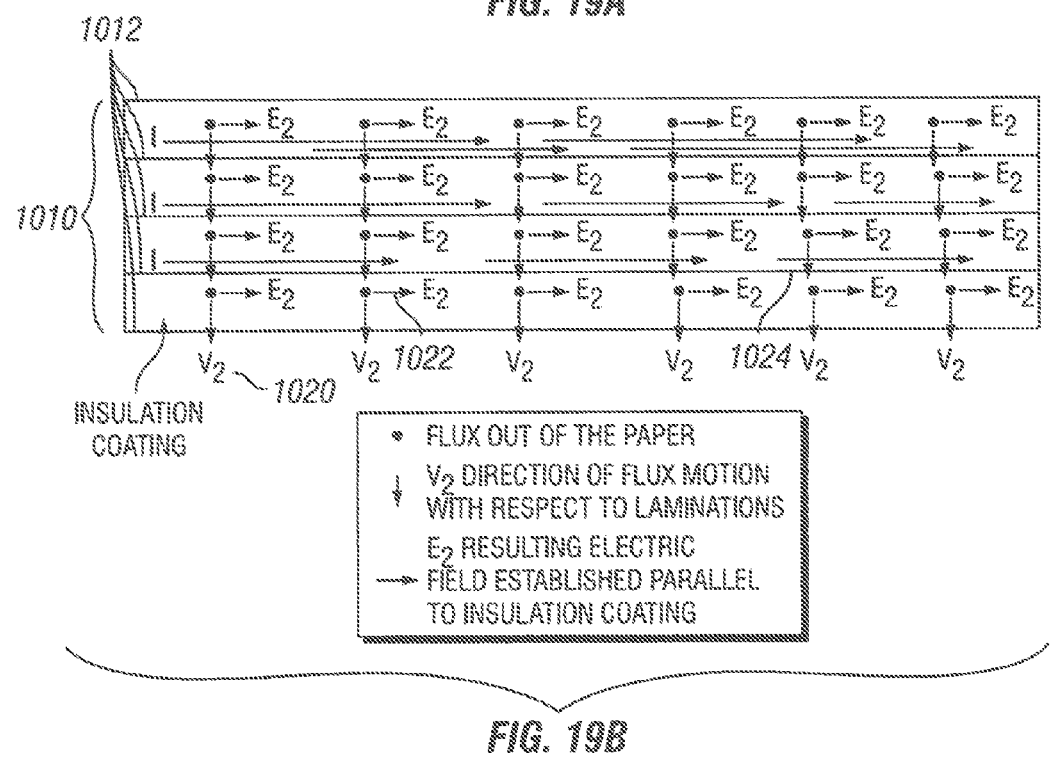

As explained herein, and with reference to FIGS. 19A and 19B, the disclosed motor will experience two flux movements within the motor. FIG. 19A is an illustration of a portion of some stator lamination plates 1010 in accordance with some embodiments of the disclosed motor. Each lamination plate 1010 may also comprise an insulating coating 1012 on the outer surfaces. As shown, a magnetic flux field 1014, indicated as coming out of the page by the dots as shown, experiences a first velocity ($v_1$) indicated by arrows 1016 pointing to the right, and an electric field ($E_1$), indicated by the arrows 1018 pointing to the top of the figure. This field ($E_1$) produces a relatively insignificant eddy current because the insulating coating 1012 between each plate inhibits the current flow. However, as shown in FIG. 19B, when a second direction of motion ($v_2$) is experienced as indicated by the arrows 1020, such motion will produce a second electric field ($E_2$) as indicated by the arrows 1022. Because this field ($E_2$) is established between the insulating coatings 1012, eddy currents (I) as indicated by arrows 1024 will flow within the metal lamination plates 1010.

Figure 20A:
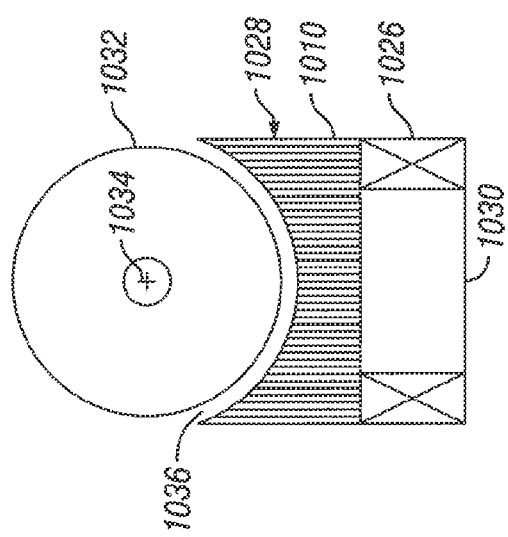
FIGS. 20A and 20B are schematic end view and side views of certain stator components in accordance with some embodiments of the disclosed inventions.
Figure 20B:
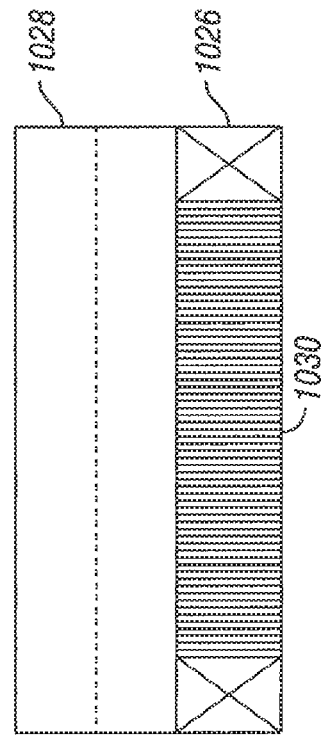

FIGS. 20A and 20B illustrate an end view and a side view of stator pole arrangements in accordance with some embodiments of the disclosed motor that enable the minimizing of the eddy currents in the salient poles due to flux movement in two directions as described above. As shown for this embodiment, a stator pole may comprise a top pole piece (called a shoe) comprising vertically disposed laminations 1028. A bottom portion of the pole may comprise standard, or radially disposed, laminations 1030. Other arrangements of laminations are also possible, the concept being that the layers of the various portions are arranged to minimize eddy currents by inhibiting current flow.

Also illustrated for this embodiment in FIGS. 20A and 20B are stator windings 1026 for generating the magnetic flux fields, rotor 1032, rotating about an axis of rotation 1034, and constant air gap 1036 between the edge of rotor 1032 and stator shoe 1028.

Additional embodiments of stator poles may also be implemented to minimize eddy currents. For example, another embodiment is to have the pole face, or shoe 1028, made of a material such as sintered steel, ferrite, or distributed air-gap material, and then bond, or otherwise fasten, the shoe 1028 to the bottom portion 1030 of the stator pole. Likewise, other embodiments may also implement stator pole pieces comprising grain-oriented steel, with the grain best oriented for lateral flux movement. Embodiments employing combinations of these techniques for eddy current minimization are also possible.

Likewise, for some embodiments, the salient poles are designed to be as short as is optimal in order to optimize the overall magnetic circuit length. This has the advantage of also lessening motor iron losses.

Finally, for some embodiments, the design of the pole windings (e.g., windings 1026) is to be of adequate wire size, but with a number of turns that is optimal. This has the advantage of keeping $I^2R$ (i.e., copper) losses to a minimum. The wire size and number of turns are preferably optimized so that enough turns are used to establish a magnetic flux of sufficient magnitude, while also keeping the $I^2R$ losses to an optimal minimum. Typically, relative to a comparable Speed Voltage dependent motor, the presently disclosed stator designs will accommodate a greater number of windings per pole.

As noted previously, the rotor design features of the presently disclosed invention also contribute to the herein described performance. As discussed above, an important feature of the disclosed rotor is that it be shaped to assist in the reduction of the factors that contribute to the generation of Back EMF. To that end, rotors that exploit Transformer Voltage (Vt) in accordance with the present disclosure will be designed to form a constant, or substantially constant, air gap with respect to the stator poles.

In addition, a rotor designed to exploit Transformer Voltage (Vt) in accordance with the disclosed embodiments of the invention will also facilitate the creation of a variable length magnetic circuit path. In general, one way to design a rotor capable of creating a variable length magnetic circuit path is to create an ellipse that, when rotated, has a circular cross-section. For some embodiments, such an ellipse may be created in the manner illustrated in FIG. 21.

Figure 21:
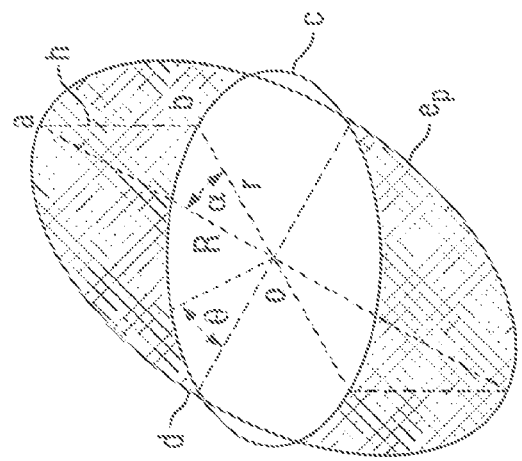
FIG. 21 illustrates a conceptual diagram of the generation of an ellipse that, when rotated, has a circular cross-section.

FIG. 21 illustrates a conceptual diagram of the generation of an ellipse that, when rotated, has a circular cross-section. Such an ellipse 1000 can be generated by drawing a reference circle c with a radius r. Projecting out of the plane of the circle c, a height h is generated from $r \sin \alpha$, where $\alpha$ is that angle of inclination of the hypotenuse R (of triangle a0b) from the plane of circle c, and where $\theta$ represents the angles generated about the point 0 in the plane of circle c. Thus, the triangle a0b is formed having a value of $R=(r^2+(r \sin \alpha)^2)^{1/2}$. Further, $R=r (\cos \alpha)^{-1}$. If the height (h) of the triangle a0b is varied sinusoidally in accordance with the angle $\theta$, then for a given $\theta$, $R=r (\cos \alpha)^{-1} \sin \theta$. Plotting an infinite number of similar triangles about $\theta$ for the full 360 degrees of circle c produces an ellipse of perimeter $e_p$ as shown in FIG. 12. Ellipse $e_p$ will always have a circular cross-section when rotated about 0 in the plane of circle c. Additional rotor designs suitable for implementation of the concepts presently disclosed are also possible.

Figure 22:
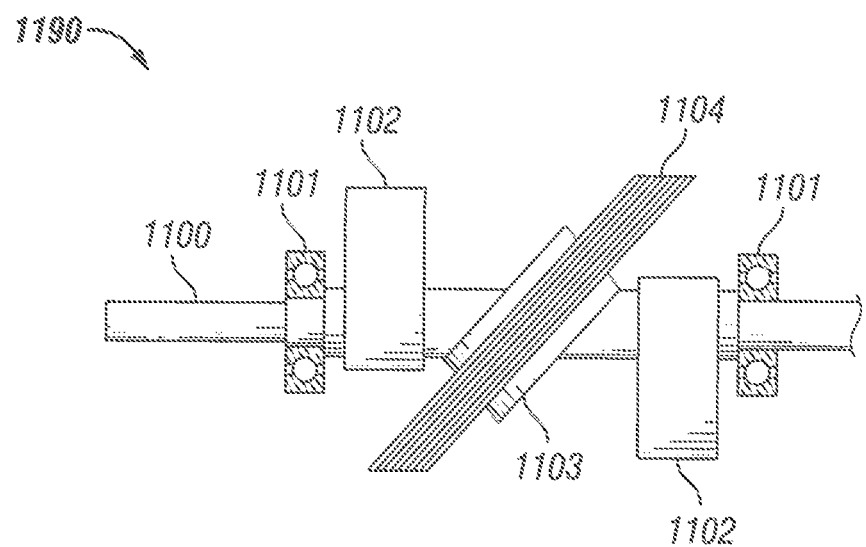
FIG. 22 is a depiction of some embodiments of the motor shaft assembly.

Having described the relevant design features for the stator and the rotor, we turn now to a description of some embodiments of the instant three phase synchronous reluctance motor system. FIGS. 22 through 25 show aspects of some embodiments of the presently disclosed three phase motor. FIG. 22 illustrates one embodiment of the motor's rotor assembly 1190, wherein 1100 is the shaft, 1101 are bearings, 1102 depicts rotational stabilizers, or counterweights, desirable to offset any eccentricity of the magnetically conductive lamination stack 1104, which may be mounted upon an arbor 1103. Other embodiments of the rotor assembly 1190, and the components of the same, may also be implemented.

For example, in some embodiments of the three phase motor any suitable type of bearing 1101 may be implemented depending on the design circumstances, intended implementation, environment of application, or the like. Thus, bearings 1101 may be single roller bearings, multiple-roller bearings, thrust bearings, conical bearings, metallic sleeve bearings, or other suitable type of bearing.

For embodiments where magnetically conductive rotor stack 1104 is mounted in a canted position with respect to shaft 1100, it may be desirable to include rotational stabilizers 1102 to dynamically balance the rotation of the shaft 1100. Any suitable stabilizers 1102 may be implemented. For example, in some embodiments stabilizers 1102 may take the form of machined metallic rings containing distributed tungsten weights to achieve dynamic balance. Other configurations are also possible.

Likewise, in some embodiments, the arbor 1103 may comprise any suitable arbor or mounting mechanism for securing the conductive stack 1104 to the shaft 1100. For example, in some embodiments, where conductive stack 1104 comprises a laminate stack, it may be desirable to use a compression arbor 1103 that facilitates the securing and positioning of the laminate. Furthermore, arbor 1103 may be formed from any alloy, compound or element which may serve to enhance motor performance. Of course, other arbors 1103 may be implemented depending upon factors such as the type of shaft 1100, design of the conductive stack 1104, as well as other factors.

In some embodiments, magnetically conductive stack 1104 may comprise a stack 1104 of individual disks laminated together. In other embodiments, stack 1104 may comprise a unitary structure, or other similar solid magnetically conductive path. In still other embodiments, stack 1104 may be replaced with any suitable magnetic material that enhances motor performance, including, but not limited to, various steel alloys, various paramagnetic materials, and distributed air-gap materials such as sintered steels and the like.

Further, in some embodiments the stack 1104 is fashioned to present a substantially cylindrical profile, such as one described with reference to FIG. 12, thereby ensuring an air gap with the stator of constant, or substantially constant, dimension at the cost of a relatively slight increase in magnetic circuit length. Such an arrangement facilitates a minimum change in magnetic potential energy across the air gap, and the production of a much reduced Speed Voltage (Vs) component of the Back EMF as described herein.

Figure 23:
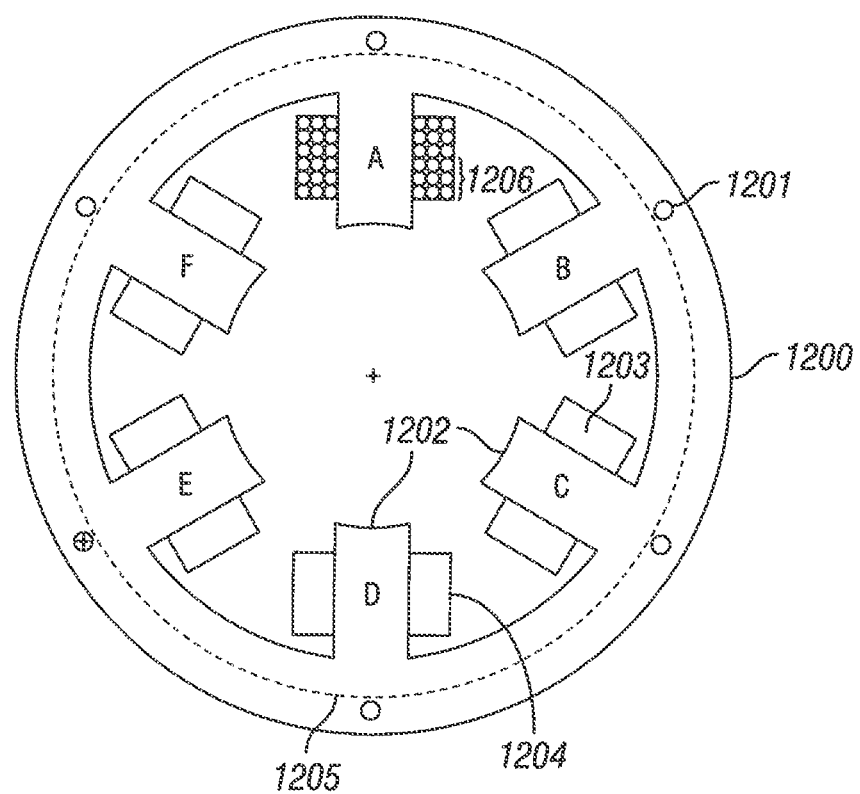
FIG. 23 is a cutaway view of some embodiments of a six pole motor stator with associated windings in place.

FIG. 23 depicts an axial view of some embodiments of a stator stack 1200 shown in the annular section view of the stack, and including: mounting and alignment holes 1201, salient pole projections 1202, coil windings 1203, and independent coil structures 1204, either spool-mounted, of freestanding as desired. Dashed line 1205 represents the mean magnetic path for flux manifesting in the annular portion of the stator steel. As also indicated in FIG. 12, independent coil structures 1204 may comprise a number of windings 1203. Included in that number of windings 1203 is a surplus amount of windings 1206. The surplus windings 1206 may be comprised of the additional amount of windings available for a given source voltage and current and due to the reduction of the Speed Voltage component (Vs) of Back EMF caused by the advantageous rotor assembly 1190 design described herein, and which enables the overall flux density produced to remain at the desired amount.

By way of non-limiting example, a conventionally designed, variable air gap motor of a source voltage V and current I may include a number of windings N to produce an output power P for the given V and I. By implementing the Back EMF reducing design disclosed herein, a constant air-gap motor can exploit a surplus of windings $N_s>N$ for the same V and I and deliver the same, or greater P. Alternatively, using the concepts disclosed herein, lower values of V and I can be implemented with the Back EMF reducing designs disclosed herein to deliver the same magnitude of P.

As discussed in connection with FIGS. 20A and 20B, stator poles 1202 and stator stack 1200 may comprise laminations or other material to optimize magnetic flux production without inducing detrimental eddy currents. Other embodiments of the stator assembly, and the components of the same, may also be implemented.

For some embodiments implementing a multi-pole stator assembly, the stator assembly 1200 may comprise silicone steel laminations, sintered steel alloys, distributed air gap material, or any other material which may suppress the formation of eddy currents and enhance motor efficiency and performance. Further, for some embodiments the stator assembly may have at least four (4), diametrically opposed salient pole projections 1202, situated at even angular increments around the stator periphery, and aligned in pole pairs 180 mechanical degrees apart, so as to constitute a complete magnetic path through the rotor at all times. Other configurations are also possible. For example, the embodiment shown in FIG. 23 includes six (6) salient pole projections 1202.

As discussed, in some embodiments, each salient pole projection 1202 supports an electrical winding or coil 1203 that develops a magnetic field in response to the passage of a current through the winding 1203. Surplus windings 1206 may likewise be integral with windings 1203 and, likewise, be energized and contribute to the magnetic field. This field provides a magnetic force which acts upon the rotor assembly 1190 and produces a useful torque.

In some embodiments, the windings 1203 and 1206 supported by said stator salient pole projections 1202, are interconnected so as to produce an additive magnetic effect across the entire pole pair, regardless of the magnetic polarity provided by the electronic controller. Other configurations are also possible.

Figure 24:
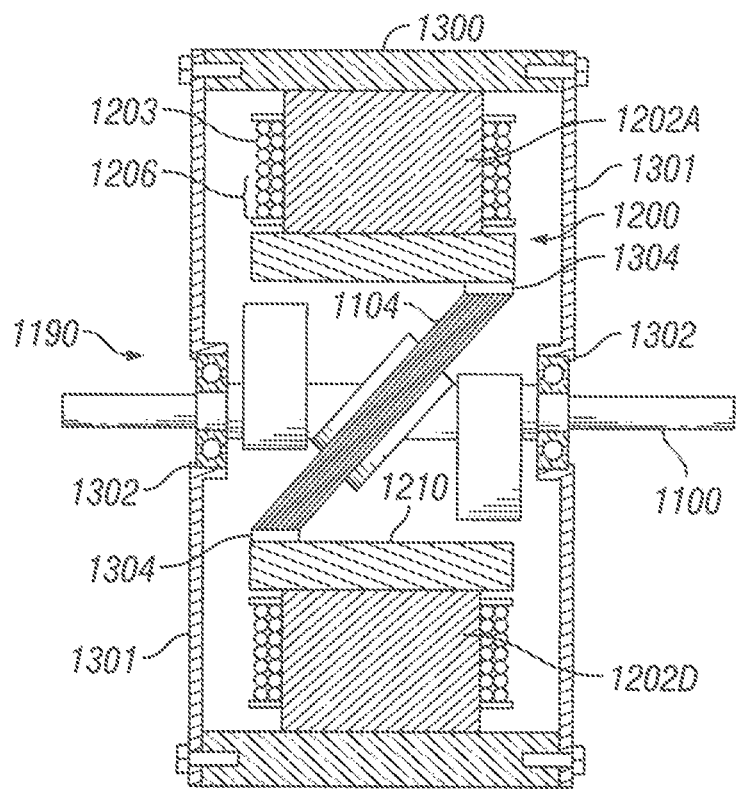
FIG. 24 is a cutaway view through the vertical axis of some embodiments of the stator assembly.

FIG. 24 is a vertical cutaway view of some embodiments of the motor frame, housing 1300 and stator stack 1200, and end bells 1301, but with the entire rotor assembly 1190 left intact for ease of understanding. FIG. 24 illustrates the motor housing 1300, motor end-bells 1301, bearing housings 1302, as well as the relative positions of the motor stator stack 1200, and the shaft assembly 1100.

As shown on FIG. 24, each stator pole (e.g., 1202A and 1202D) includes a pole face 1210. Across the constant air gap from the pole face 1210, rotor stack 1104 rotates in the region immediately opposite the pole face 1210. As disclosed herein, the stack 1104 is designed so that, at any given moment in the rotation, the edge of the rotor stack 1104 is opposite a flux zone 1304 located on the face 1210.

Figure 25:
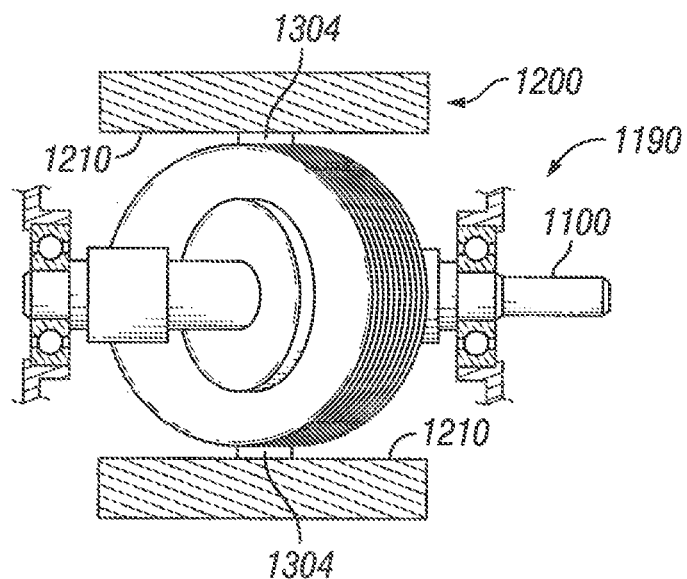
FIG. 25 shows the same cutaway view of some embodiments of the stator assembly shown in FIG. 24, however the rotor has been advanced in angular rotation by 90 mechanical degrees.

FIG. 25 shows the apparatus displayed in FIG. 24, except that the rotor assembly 1190 and shaft 1100 have been advanced 90 mechanical degrees, thus demonstrating the maximum angular rotor displacement possible with one pole set energized. As shown, the flux zone 1304 has traveled along the face 1210. As the rotor assembly 1190 continues to rotate, the flux zone 1304 will travel back-and-forth along the pole face 1210 in a path described by simple harmonic motion.

Figure 26:
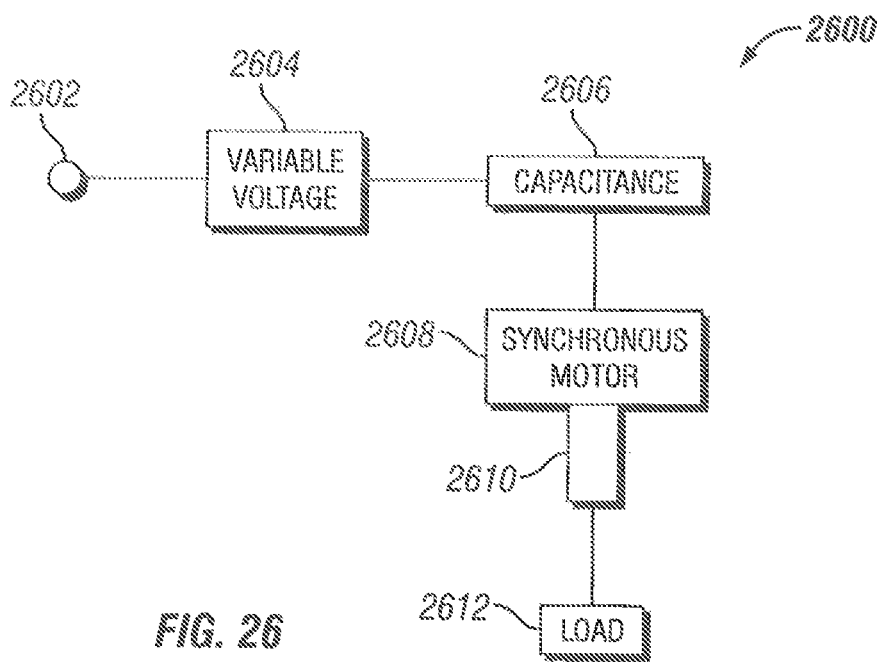
FIG. 26 illustrates a schematic block diagram of some embodiments of a three phase synchronous motor system.

FIG. 26 is a functional block diagram of the presently disclosed three phase synchronous reluctance motor system in accordance with some embodiments. As shown, motor system 2600 may generally comprise an input power source 2602 that provides alternating phase current and voltage (e.g., AC current). The number of phases may vary according to the intended application and other design parameters. Embodiments disclosed herein are made with reference to three phase AC power, but they also pertain to electric machines employing N number of distinct phases, where N is an integer equal to, or greater than two.

In some embodiments, input power 2602 may be further conditioned through a variable voltage supply 2604, which may comprise a variable transformer or the like. Voltage conditioner 2604 may be selected to be compatible with the phase of the input power 2602. For example, three phase AC input power 2602 may be conditioned with a variable conditioner 2604 that also has three phase output. Other configurations are also possible.

Embodiments of the system 2600 may also include capacitive elements 2606. The number and characteristic of capacitive elements 2606 will, of course, vary with the intended application and characteristics of the system 2600. For example, a three phase system 2600 may comprise three capacitive elements 2606 in a manner as described herein. Likewise, the voltage ratings for capacitive elements 2606 may vary in accordance with the system 2600 requirements (e.g., high voltage capacitive elements 2606 may be used in high voltage applications, or the like).

System 2600 also includes synchronous motor 2608. Synchronous motor 2608 may comprise rotor and stator assemblies as described in more detail herein. Embodiments of system 2600 include a synchronous motor 2608 comprising pairs of stator windings that correspond to the phase of the applied input power 2602. For example, a system 2600 with three phase input power 2602 may comprise a synchronous motor 2608 with three pairs of stator windings on a six-pole stator assembly (i.e., one pole for each half of the winding pair) as shown, for example, in FIG. 23.

Synchronous motor 2608 may also comprise an output shaft 2610 that drives an external load 2612. Embodiments of the system 2600 may comprise a shaft 2610 that is suitable for the intended environment and load 2612. Embodiments of external load 2612 may also comprise monitoring or diagnostic equipment (not separately shown) to evaluate the operational conditions of the system 2600.

Turning to an embodiment of system 2600 which employs three phase input power 2602, and with reference to FIGS. 23, 24 and 26, for such a system 2600 synchronous motor 2608 may comprise a stator assembly 1200 with six salient pole projections 1202, each wound with its own isolated electrical winding 1203. As noted, these windings 1203 may be utilized in pairs on appropriate pairs of salient pole projections (e.g., 1202A and 1202D), and may be connected in series, or in parallel depending upon design requirements. The magnetic flux circuits, for such a three phase embodiment, are typically utilized in series. The use of discrete pole windings 1203, ensures that the inductive characteristics of each winding 1203 will be "lumped," thereby allowing for control over the impedance created by the corresponding ampere turns.

Figure 27:
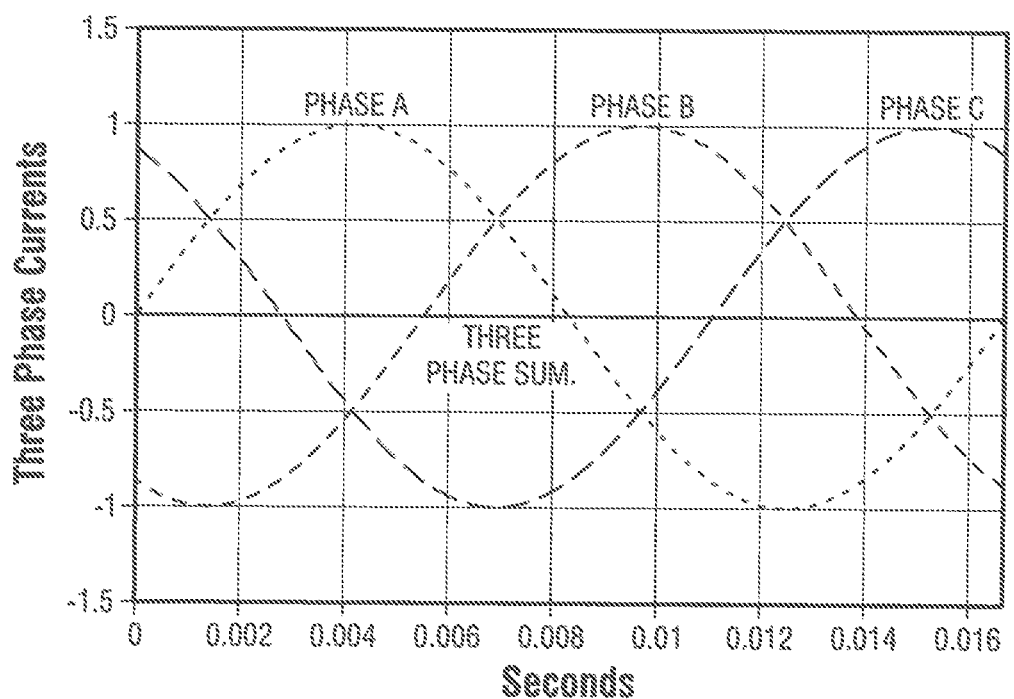
FIG. 27 illustrates a phase diagram illustrating a vector sum in accordance with existing three phase reluctance motors.

The placement of each salient pole 1202 around the stator assembly 1200 also enables deliberate placement of each active inductance, and allows for the utilization of a phase-vector situation which does not occur in existing three phase distributed wave windings of the prior art. For example, and with reference to FIG. 27, which is a phase diagram in accordance with existing three-phase reluctance motors, the three currents (phase A, phase B, and phase C) are developed 120 electrical degrees out of phase with other, and will produce a vector sum of zero (three phase sum plot).

In contrast, embodiments as disclosed herein which employ discrete coil windings 1203 have different characteristics as follows. Considering each coil winding 1203 individually, and, for purposes of explanation, imagining that each winding 1203 is being wound in place upon each particular salient pole projection 1202, and further imagining that the winding 1203 is wrapped from the outer limit of the pole 1202 to the inner limit of the pole 1202, provides poles 1202 which are 180 mechanical degrees apart from each other, and which are wound in an opposite sense with respect to any current applied at the starting point of the winding 1203.

Accordingly, for embodiments with pole pairs (e.g., 1202A and 1202D) connected in series, for example, by joining them at their finishing points, a current flowing from one side into the coil pair will produce a magnetic polarity opposite to that of a current flowing from the other side into the same pole pair. Thus, the resultant magnetic vector behaves as if one phase current wave is reversed in polarity as shown in FIG. 28.

Figure 28:
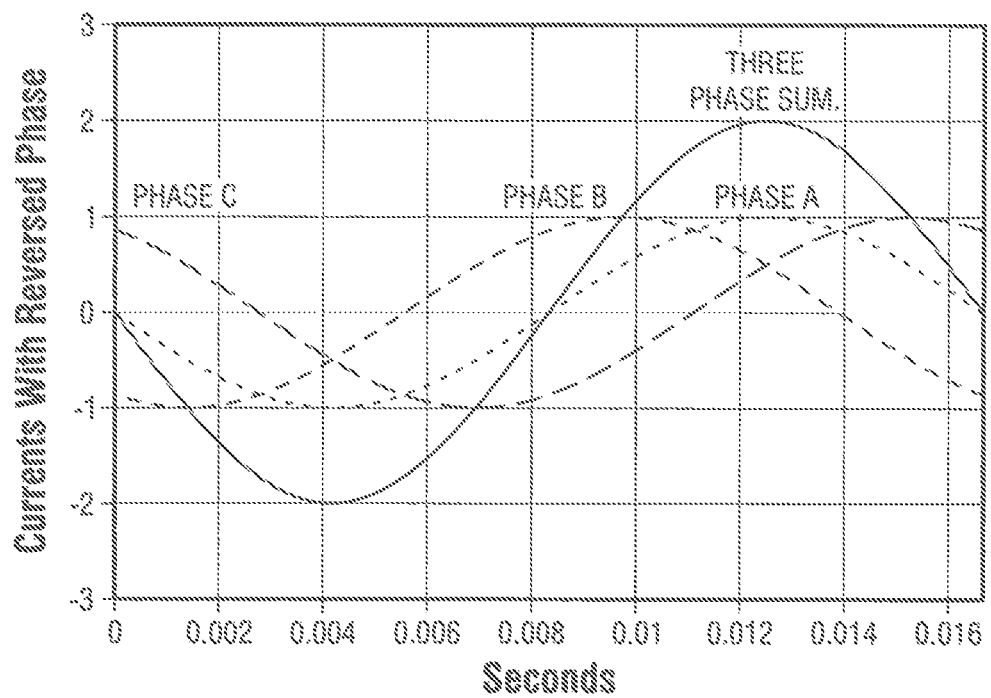
FIG. 28 illustrates a phase diagram of a vector sum in accordance with some embodiments of the invention.

As shown in FIG. 28, for these embodiments, the resultant phase wave has twice the magnitude of the component waves, and the maximum amplitude of the resultant wave occurs at 90 degrees, and 270 degrees, although the total wave occupies a full 360 degrees.

Figure 29:
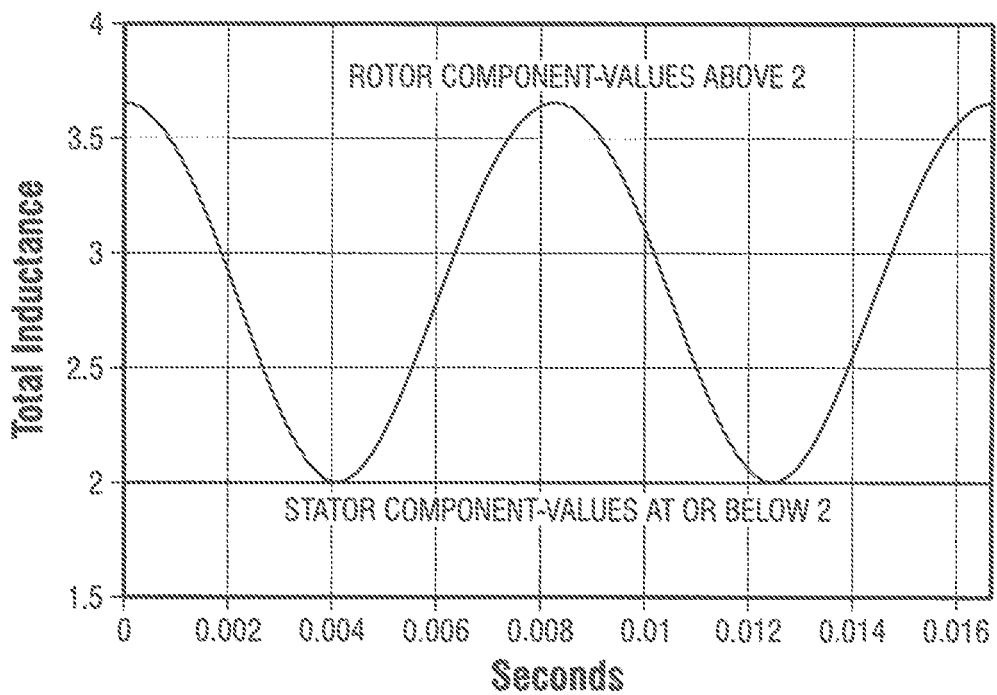
FIG. 29 illustrates a plot of reluctance value positions for a rotor assembly in accordance with some embodiments of the invention.

Embodiments of the disclosed invention which employ a rotor assembly as disclosed herein (e.g., rotor assembly 1190) may take optimal advantage of this resultant phase wave by providing maximum values for reluctance at these same phase positions. FIG. 29 illustrates a plot of the reluctance value positions for the presently disclosed rotor assembly 1190 in accordance with some embodiments.

Accordingly, embodiments configured as described above will synchronize with the polar field resultant at an angular velocity of 2700 RPM, which is below the expected value of 3600 RPM, as expected from the calculation:

3600 RPM×270/360=2700 RPM.

Other configurations and synchronous RPM values are also possible.

In addition, embodiments that employ a rotor assembly 1190 with a canted flux path element on rotor assembly 1190 may also advantageously deflect part of the resultant wave during acceleration of the motor, thereby absorbing a portion of lateral force exerted by the simple harmonic motion of the flux path under the influence of the resultant magnetic field. This action provides significant torque to the rotor assembly 1190 below its synchronous speed, and enables a synchronous reluctance motor that is self-starting, a feature that is lacking in existing synchronous motors.

The load characteristics of a synchronous reluctance machine, configured in accordance with the principles disclosed herein, are relatively complex, therefore, the following explanation of several additional characteristics of the machine's functioning are provided before addressing the loading features in particular. Specifically, the following topics are addressed:

a.) Time-Varying Inductance Due to Rotor Geometry;
b.) Calculating an Inductance Value;
c.) Angular Tracking; and
d.) Application of Load.

Turning first to the topic of Time-Varying Inductance Due to Rotor Geometry. An important characteristic of embodiments of the herein disclosed rotor assembly (e.g., 1190) is that it varies the inductance of the overall magnetic circuit as a function of its angular position in space. Hence, when the rotor's minimum diameter is aligned with two in-line salient poles (e.g., FIGS. 7B & 14B), the magnetic circuit inductance will be at a maximum value. However, when the rotor's maximum diameter occupies the same position (e.g., FIGS. 7A & 14A), the inductance will be at a minimum value. During rotation, therefore, the inductance becomes a time-varying parameter, which can contribute to the electrical impedance.

Accordingly, this time-varying value for the impedance may be dealt with in an advantageous manner. For example, examination of the inductance curve in FIG. 29 demonstrates that, for those embodiments, there are two parts associated with this measurement; the stator component, and the rotor component. In accordance with embodiments of the synchronous motor disclosed herein, the rotor component varies with time while the stator impedance does not, however, the entire value of inductance at any given time has an effect upon circuit performance, especially, for example, where resonance phenomena exist.

Turning next to topic of Calculating The Inductance Value. There are at least two ways to establish the inductance of the magnetic circuit for the herein disclosed embodiments with respect to the rotor's position:

1.) Measure the total circuit Inductance at its minimum value (Rotor at 90 deg.), and the total inductance the maximum value (Rotor at 0 deg.). The difference between these two measurements will be the maximum inductance contribution from the rotor.

2.) After determining the above described values, the rotor-only value may be averaged over 180 mechanical degrees, and then added to the stator-only value.

It has been found through experimentation that the second method gives preferable results for producing a resonant response, because the average inductance value can be equated to a specific value of capacitance without involving any electronic switching.

Turning to topic the topic of space angle and Angular Tracking The term space angle, as used herein, represents a concept exhibited in many rotating electrical machines. Simply put, it is an angular displacement in space which occurs during the rotation of a rotor which changes the alignment of the rotor with respect to a given pole set, without causing a change in rotational speed. In some respects, the space angle may be considered as the mechanical counterpart of an electrical phase angle. Knowing this, one can see that angular tracking is simply a measure of how well the rotor "tracks" or holds the position of its established space angle while rotating. With these properties established and defined the properties of the herein disclosed system can be explained when a load is applied.

Application of a Load.

For embodiments of the herein disclosed synchronous reluctance motor's behavior with respect to the application of a mechanical load the following assumptions apply:

a.) The motor's windings are operating as the inductive component of a tank circuit which is in resonance, or anti-resonance, with the line frequency.

(i.) If in resonance, the capacitors and the inductive windings are connected in series.

(ii.) If utilized in anti-resonance, then the inductive windings and the capacitors are connected in parallel. However, in such an arrangement, the resistive value of the windings, R, becomes important. If R is large with respect to the inductance L, the combination may downshift the resonant frequency of the motor significantly.

b.) The motor's acceleration phase has been completed.

c.) Load is being applied slowly by means of a Prony brake, or other external load, and is being monitored constantly.

Under these conditions, embodiments of the invention pull a large current when lightly loaded, and exhibit a low power factor. However, as load is increased, the power factor improves, and the current begins to drop. The reduction of load current with increasing mechanical load is a highly unexpected behavior in prior art motor design. However, this effect can be explained as follows.

When the herein described embodiments of the synchronous reluctance motor reach synchronous speed (e.g., 2700 RPM), the rotor's minor diameter is aligned with the motor's rotating magnetic wave. Under these conditions, the flux density in each pole is situated in the geometric center of the pole face. Accordingly, the space angle is almost zero degrees, and the power factor is very low because the magnetic circuit is very far from resonance. However, because the rotor is now moving in synchronism with the magnetic field, the relative simple harmonic motion component with respect to the rest position of the flux has disappeared, and only the rotary component of angular velocity is apparent.

As mechanical load is applied, the space angle slowly begins to increase, and the tracking factor changes position. The rotor twists in space as a function of load, and its instantaneous diameter increases as load torque increases. This increase in diameter causes an increase in inductance, and so the magnetic circuit slowly approaches the value necessary to sustain series resonance. This action drives up the power factor, but it also stretches the magnetic flux lines, and thereby causes the motor torque to automatically match the external torque created by the load.

Figure 30:
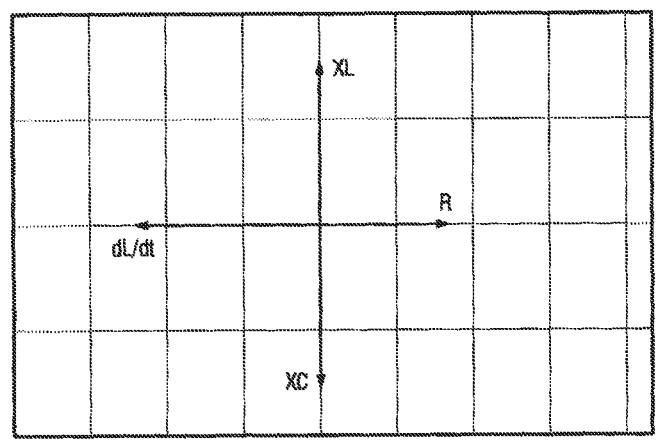
FIG. 30 illustrates a vector plot of some system parameters under a resonance condition.

The advance of the space angle toward the 90 degree position drives the power factor toward unity because it automatically "tunes" the tank circuit as it rotates in space. However, as loading continues, the rotor begins to "slip" a bit with respect to the magnetic field this has the effect of providing a low frequency rotating field to the armature, and the change in inductance per rotation now takes effect. The parameter dL/dt slowly begins to create a Back EMF, which drives down the current. This is illustrated in FIG. 30.

However, this action has little effect upon the torque at this point, because it is being mechanically created by the stretched lines of magnetic force operating directly upon the geometry of the rotor. For some embodiments of the herein disclosed synchronous reluctance motor, this process will continue until equilibrium is established between the motor torque developed, and the current available from the source.

The following exemplary performance has been observed for some embodiments of the synchronous reluctance motor.

No load current=20.2 amps rms, power factor=0.766, Shaft horsepower=0.

Full load current=12.5 amps rms, power factor=0.995, Shaft horsepower=1.25.

Motor Losses.

The herein described synchronous reluctance motor, like any other motor, is susceptible to losses, such as $I^2R$ losses, friction and windage losses, hysteresis losses, iron losses, and stray copper losses. However, unlike existing motors, the presently disclosed synchronous reluctance motor is subject to additional iron losses which are developed because of the lateral motion of the flux across the pole pieces during non-resonant, non-synchronous conditions.

These additional losses arise, because standard silicone steel laminations can only suppress the formation of eddy currents in one direction at a time. But, the compound motion of the flux in the presently disclose synchronous reluctance motor gives rise to two eddy current components which are perpendicular to each other within the stator steel. Accordingly, one current is suppressed, while the other is given free reign.

As discussed herein, there are several solutions to this additional loss. For example, for some embodiments a distributed air gap material, such as Mix-40, may be employed in the stator assembly. For such an embodiment, stator iron losses may be reduced by as much as 76%. Another solution involves employing a stator design with reduced iron content. Other solutions are also possible.

While the invention has been described in detail and with reference to specific embodiments thereof, it will be apparent to one skilled in the art that various changes and modifications can be made therein without departing from the spirit and scope thereof. Accordingly, it is intended that the present invention cover the modifications and variations of this invention provided they come within the scope of the appended claims and their equivalents.

What is claimed is:

1. An alternating current motor system comprising:
a stator assembly comprising:
an even number of magnetically conductive salient poles, each salient pole comprising a pole face;
a winding for generating magnetic flux within at least one of the salient poles; and
wherein the salient poles are arranged in pairs located on opposite sides of a central axis and positioned to form a stator cavity with a substantially uniform circumference;
a rotor assembly comprising:
a shaft mounted to rotate about the central axis;
a magnetically conductive element mounted to the shaft and shaped so that when rotated about the central axis the magnetically conductive element directs a flux zone along the face of a salient pole in a substantially periodic motion, so that the length of the magnetic flux path formed by the magnetically conductive element and the salient pole varies with the substantially periodic motion of the flux zone; and
wherein the magnetically conductive element comprises an outer edge that when rotated about the central axis circumscribes a path within the stator cavity that is substantially uniformly spaced from each salient pole face thereby forming a substantially uniform air gap between the outer edge of the magnetically conductive element and each salient pole face.

2. The motor system of claim 1 further comprising:
a capacitive element connected in series with the winding.

3. The motor system of claim 1 further comprising:
a capacitive element connected in parallel with the winding.

4. The motor system of claim 1 wherein the winding is capable of accepting a phased input power.

5. The motor system of claim 4 wherein the winding is capable of accepting poly-phase input power.

6. The motor system of claim 5 wherein the poly-phase input power comprises N phases, where N is an integer greater than or equal to 2.

7. The motor system of claim 1 further comprising multiple pairs of windings wherein each pair of windings is capable of accepting a phased input power.

8. The motor system of claim 7 wherein each pair of windings accepts a different phase of input power.

9. The motor system of claim 1 wherein the motor's inductance is utilized as the inductive component of a tank circuit such that the inductive field energy is caused to oscillate frequency resonance.

10. The motor system of claim 1 wherein the motor's inductance is utilized as the inductive component of a tank circuit such that the inductive field energy is caused to oscillate frequency anti-resonance.

11. The motor system of claim 1 wherein the magnetically conductive element is substantially elliptical in shape, and is mounted on the shaft at an angle that is canted with respect to the central axis.

12. The motor system of claim 11 wherein the substantially elliptical shape is describable with reference to a circle with a radius r at an angle $\theta$ measured from the center of the circle and in the plane of the circle;
wherein a hypotenuse R, may be drawn at an angle of inclination $\alpha$ from the plane of the circle and at a length given by R=r cos $\alpha$; and
wherein the perimeter of the substantially elliptical shape is described by rotating R about the full 360 degrees of angle $\theta$ about the circle while varying the length of R in accordance with R=r (cos $\alpha$)$^{-1}$ sin $\theta$.

13. The motor system of claim 1 wherein the magnetically conductive element further comprises a laminated structure.

14. The motor system of claim 13 wherein the laminated structure further comprises a laminated stack of individual disks.

15. The motor system of claim 1 wherein the magnetically conductive element further comprises a unitary, non-laminated structure.

16. The motor system of claim 1 wherein the magnetically conductive element further comprises a steel alloy.

17. The motor system of claim 1 wherein the magnetically conductive element further comprises a paramagnetic material.

18. The motor system of claim 1 wherein the magnetically conductive element further comprises a distributed air gap material.

19. The motor system of claim 18 wherein the distributed air gap material further comprises sintered steel.

20. The motor system of claim 1 wherein the magnetically conductive salient poles are constructed so as to minimize eddy currents from flux movement in at least two directions.

21. The motor system of claim 20 wherein the salient poles further comprise:
a shoe portion; and
a bottom portion.

22. The motor system of claim 21 wherein the shoe portion further comprises a laminated structure with laminations oriented in a first direction, and the bottom portion further comprises a laminated structure with laminations oriented in a second direction.

23. The motor system of claim 22 wherein the first direction and the second direction are substantially orthogonal.

24. The motor system of claim 21 wherein the shoe portion further comprises a grain-oriented steel structure with a grain oriented in a first direction, and the bottom portion further comprises a grain oriented steel structure with a grain oriented in a second direction.

25. The motor system of claim 24 wherein the first direction and the second direction are substantially orthogonal.

26. The motor system of claim 20 wherein the salient poles further comprise sintered steel material.

27. The motor system of claim 20 wherein the salient poles further comprise ferrite material.

28. The motor system of claim 20 wherein the salient poles further comprise distributed air gap material.

29. The motor system of claim 1 wherein the salient poles are of a size that keeps the overall magnetic circuit length at an optimum value to lessen motor iron losses.

30. The motor system of claim 1 wherein the winding further comprises a number of turns of electrical conductor.

31. The motor system of claim 30 wherein the conductor size and number of turns are at an predetermined amount to establish a magnetic flux of a predetermined value and keep copper losses to a minimum.

32. The motor system of claim 1 wherein the motor is self-starting.

* * * * *